(12) United States Patent
Sweet, III et al.

(10) Patent No.: US 11,074,463 B2
(45) Date of Patent: *Jul. 27, 2021

(54) DYNAMIC SENSOR OPERATION AND DATA PROCESSING BASED ON MOTION INFORMATION

(71) Applicant: QUALCOMM Incorporated, San Diego, CA (US)

(72) Inventors: Charles Wheeler Sweet, III, San Diego, CA (US); Hugo Swart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

This patent is subject to a terminal disclaimer.

(21) Appl. No.: 15/585,054

(22) Filed: May 2, 2017

(65) Prior Publication Data

US 2018/0322348 A1 Nov. 8, 2018

(51) Int. Cl.
*G06K 9/00* (2006.01)
*G01S 17/42* (2006.01)
(Continued)

(52) U.S. Cl.
CPC ....... *G06K 9/00805* (2013.01); *G01C 21/005* (2013.01); *G01S 7/40* (2013.01);
(Continued)

(58) Field of Classification Search
CPC .. G06K 9/00805; G01C 21/005; G01C 19/02; G01S 7/40; G01S 7/497; G01S 7/52004;
(Continued)

(56) References Cited

U.S. PATENT DOCUMENTS 9,383,753 B1 7/2016 Templeton et al.
9,594,381 B1 3/2017 Clark et al.
(Continued)

FOREIGN PATENT DOCUMENTS

DE 102011056050 A1 6/2013
DE 102017215586 * 3/2019
(Continued)

OTHER PUBLICATIONS

Definition of Frame Rate, TechSmith, Mar. 2017. (Year: 2017).*
International Search Report and Written Opinion—PCT/US2018/022724—ISA/EPO—dated Jun. 6, 2018.

*Primary Examiner* — Michael P Nghiem
(74) *Attorney, Agent, or Firm* — QUALCOMM Incorporated

(57) ABSTRACT

Methods and apparatuses are disclosed for determining a characteristic of a device's object detection sensor oriented in a first direction. An example device may include one or more processors. The device may further include a memory coupled to the one or more processors, the memory including one or more instructions that when executed by the one or more processors cause the device to determine a direction of travel for the device, compare the direction of travel to the first direction to determine a magnitude of difference, and determine a characteristic of the object detection sensor based on the magnitude of difference.

25 Claims, 14 Drawing Sheets

(51) Int. Cl.

| | |
|---|---|
| *G06Q 10/04* | (2012.01) |
| *G05D 1/00* | (2006.01) |
| *G01C 21/00* | (2006.01) |
| *G01S 7/497* | (2006.01) |
| *G01S 17/933* | (2020.01) |
| *G01S 7/40* | (2006.01) |
| *G01S 15/93* | (2020.01) |
| *G01S 7/52* | (2006.01) |
| *G01S 13/933* | (2020.01) |
| *G01S 19/51* | (2010.01) |
| *G01P 3/66* | (2006.01) |
| *G01C 19/02* | (2006.01) |
| *G01S 17/86* | (2020.01) |

(52) U.S. Cl.
CPC .......... *G01S 7/497* (2013.01); *G01S 7/52004* (2013.01); *G01S 13/933* (2020.01); *G01S 15/93* (2013.01); *G01S 17/42* (2013.01); *G01S 17/933* (2013.01); *G05D 1/0027* (2013.01); *G06Q 10/04* (2013.01); *G01C 19/02* (2013.01); *G01P 3/66* (2013.01); *G01S 17/86* (2020.01); *G01S 19/51* (2013.01)

(58) Field of Classification Search
CPC ...... G01S 13/9303; G01S 15/93; G01S 17/42; G01S 17/933; G01S 17/86; G01S 19/51; G05D 1/0027; G06Q 10/04; G01P 3/66
USPC .......................................................... 702/150
See application file for complete search history.

(56) References Cited

U.S. PATENT DOCUMENTS

| | | | | |
|---|---|---|---|---|
| 9,906,708 | B2* | 2/2018 | Ito .................... | H04N 5/23212 |
| 10,126,722 | B2* | 11/2018 | Sweet, III ............ | G05D 1/0246 |
| 2002/0149679 | A1* | 10/2002 | Deangelis .......... | A63B 24/0003 |
| | | | | 348/207.99 |
| 2006/0146142 | A1* | 7/2006 | Arisawa .................... | G01S 5/16 |
| | | | | 348/211.11 |
| 2007/0129853 | A1 | 6/2007 | Greenfeld et al. | |
| 2007/0140527 | A1* | 6/2007 | Yamamoto ......... | G06K 9/00805 |
| | | | | 382/104 |
| 2007/0171033 | A1* | 7/2007 | Nagaoka ............. | G06K 9/6289 |
| | | | | 340/435 |
| 2010/0182396 | A1* | 7/2010 | Kroepfl .................. | G01S 19/14 |
| | | | | 348/36 |
| 2010/0188932 | A1 | 7/2010 | Hanks et al. | |
| 2010/0250126 | A1* | 9/2010 | Epshtein ............ | G01C 21/3602 |
| | | | | 701/438 |
| 2011/0013020 | A1 | 1/2011 | Jo | |
| 2012/0200703 | A1* | 8/2012 | Nadir ................... | G02B 27/644 |
| | | | | 348/144 |
| 2013/0321627 | A1* | 12/2013 | Turn, Jr. ............... | B60W 30/00 |
| | | | | 348/148 |
| 2014/0347206 | A1* | 11/2014 | Steinlechner ......... | G01S 7/4026 |
| | | | | 342/5 |
| 2015/0241987 | A1 | 8/2015 | Liu et al. | |
| 2016/0003938 | A1* | 1/2016 | Gazit ...................... | G01S 13/02 |
| | | | | 342/81 |
| 2016/0073048 | A1* | 3/2016 | Howe ...................... | H04N 5/77 |
| | | | | 348/144 |
| 2016/0205384 | A1* | 7/2016 | Sekiguchi ............ | H04N 13/239 |
| | | | | 348/50 |
| 2016/0284129 | A1* | 9/2016 | Nishizawa .............. | G06F 3/013 |
| 2017/0090481 | A1* | 3/2017 | Clark ...................... | G05D 1/101 |
| 2017/0274822 | A1* | 9/2017 | Haggerty .................. | B60R 1/00 |
| 2018/0032040 | A1* | 2/2018 | Sweet, III ............ | G05D 1/0246 |
| 2018/0032042 | A1* | 2/2018 | Turpin ................ | H04N 13/239 |

FOREIGN PATENT DOCUMENTS

| | | |
|---|---|---|
| EP | 3043202 A1 | 7/2016 |
| GB | 2486325 A | 6/2012 |
| WO | WO-2016021747 A1 | 2/2016 |
| WO | WO-2016094568 A1 | 6/2016 |
| WO | WO-2019048111 A1 * 3/2019 ........... G01S 15/931 |

* cited by examiner

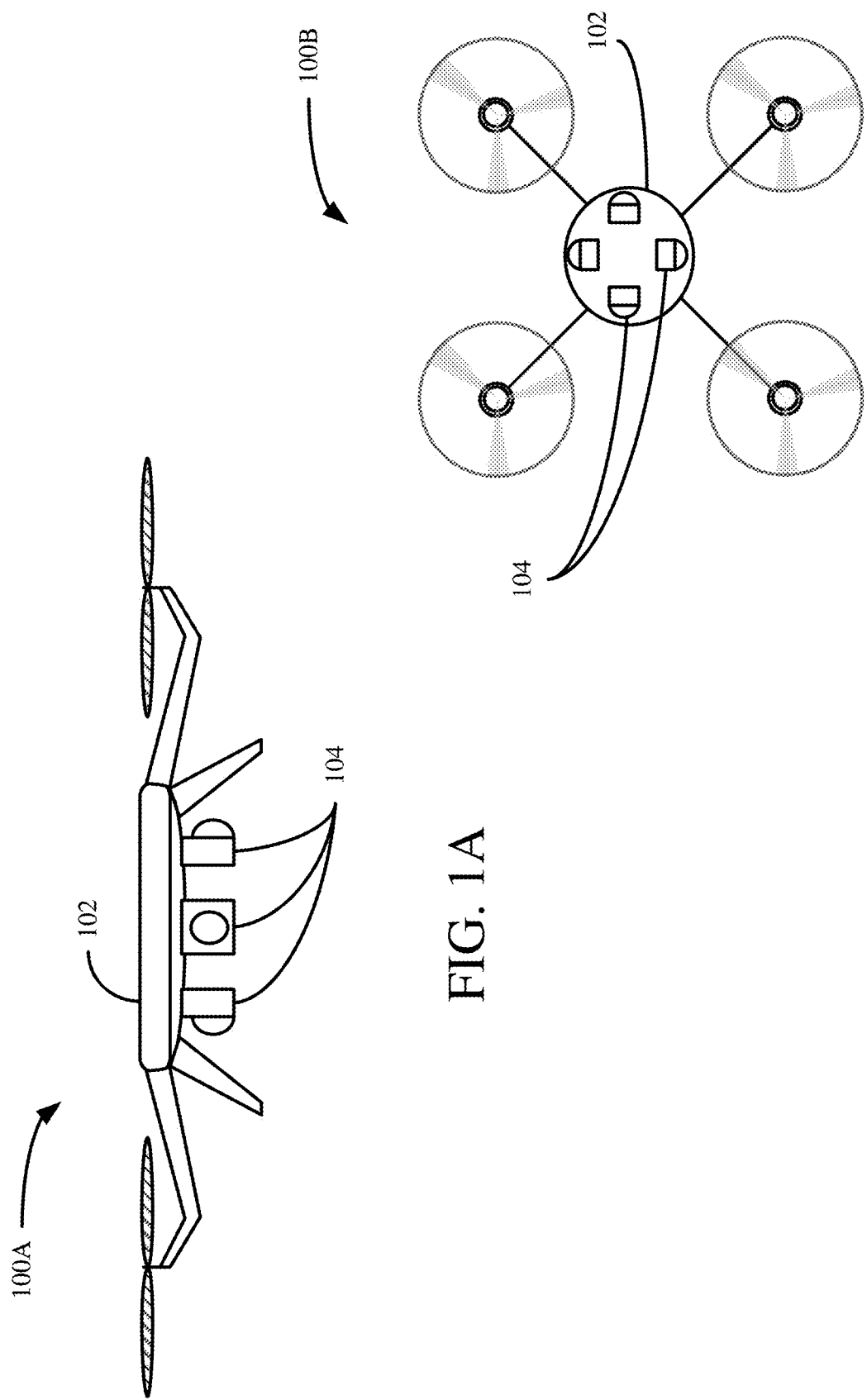

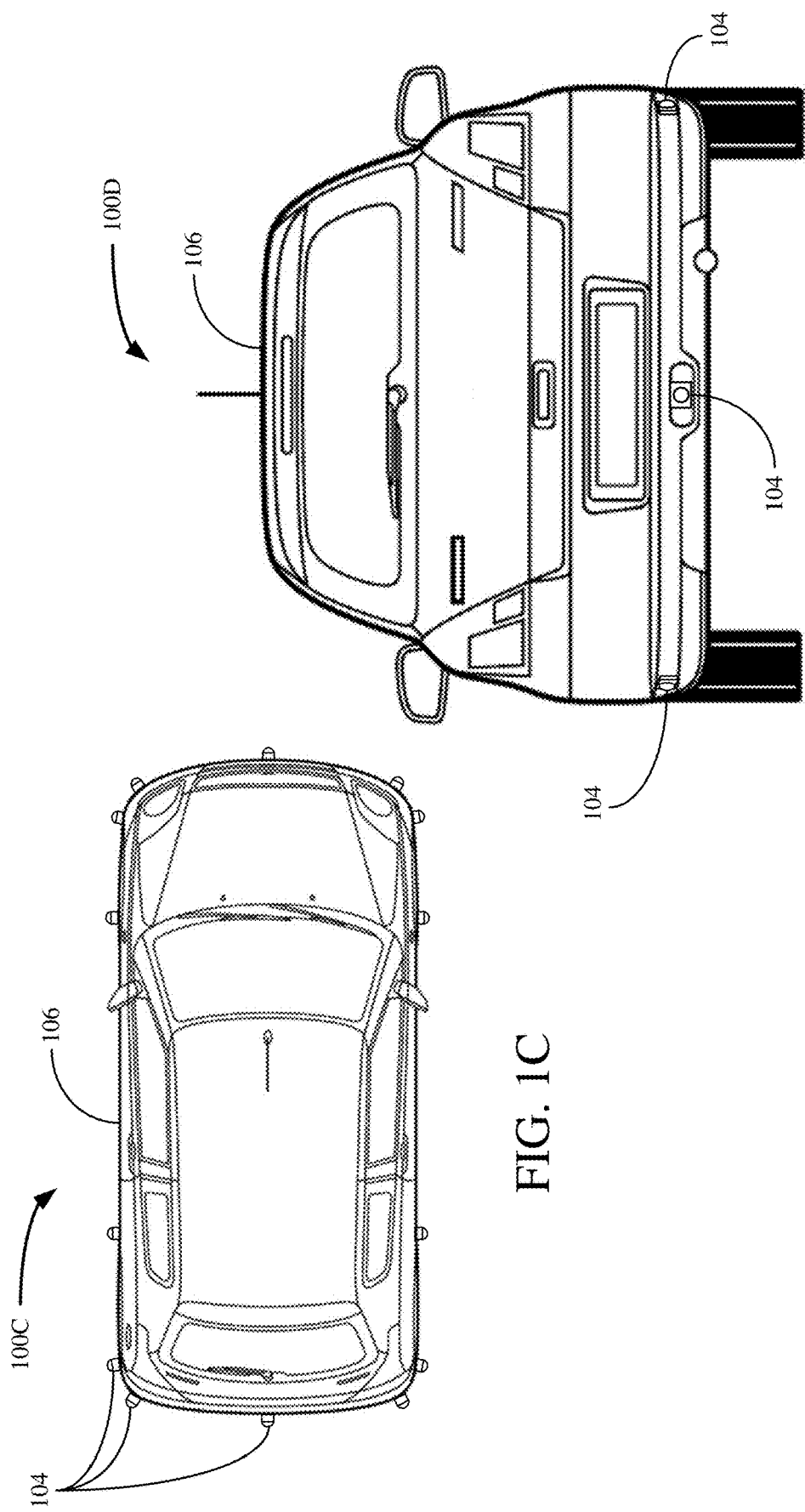

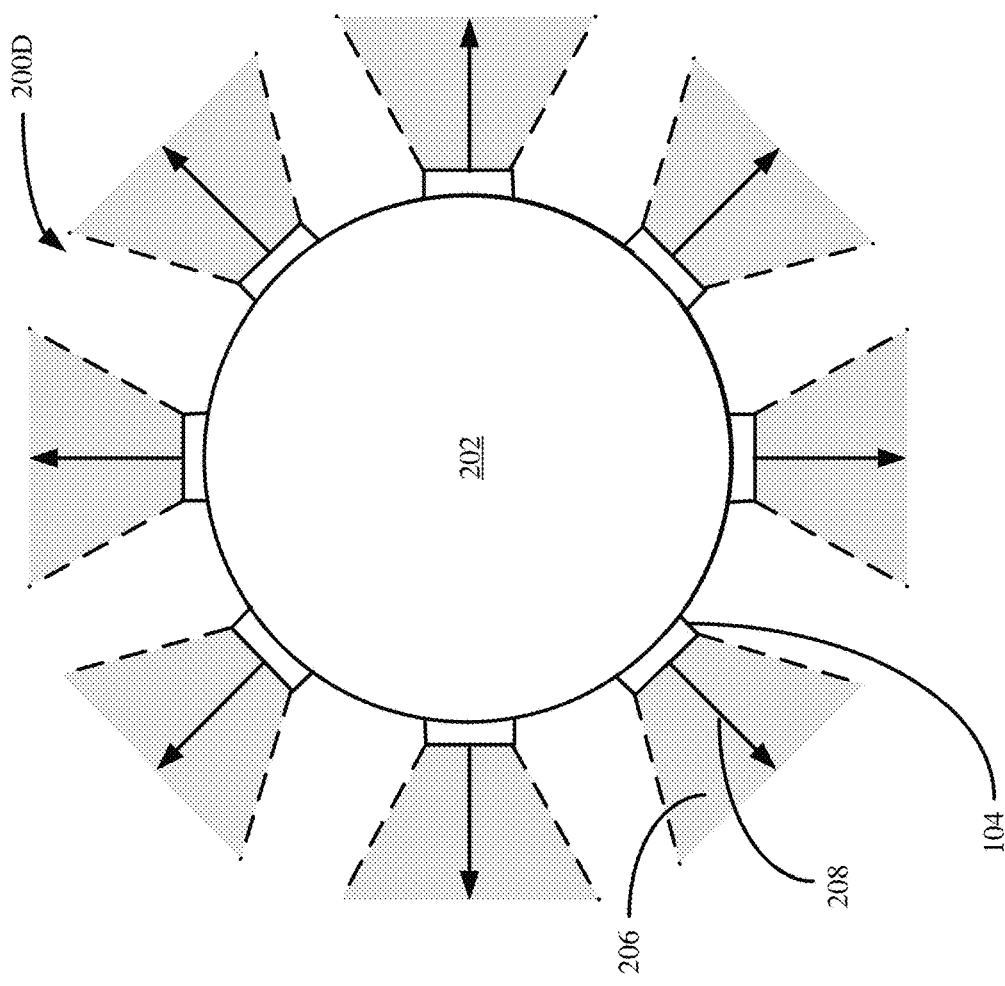
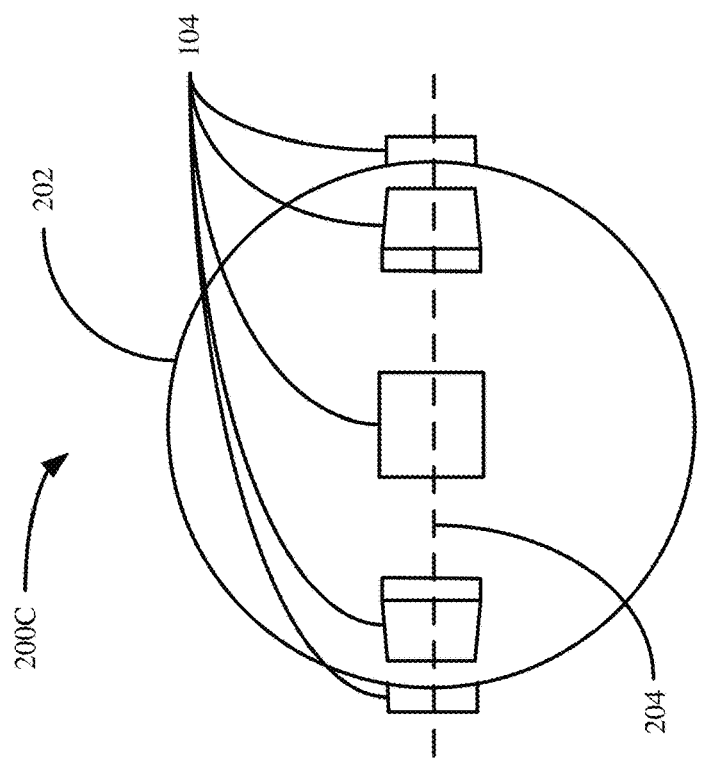
FIG. 2D
FIG. 2C

DYNAMIC SENSOR OPERATION AND DATA PROCESSING BASED ON MOTION INFORMATION

TECHNICAL FIELD

The present disclosure relates generally to operation of sensors and processing of sensor captured data, and specifically to dynamically determining sensors and processing of sensor captured data based on motion information.

BACKGROUND

Various devices are equipped with object detection and tracking sensors (such as cameras, RADAR, SONAR, laser sensors/scanners, and so on) that are capable of capturing information about a sensor's environment in one or more directions. While some object detection sensors may omni-directionally perceive their environment (such as some RADAR systems or LIDAR systems with rotating antennas), many object detection sensors capture information in a direction of capture and within a field of capture based on the orientation of the sensor. Some object detection sensors may be used for obstacle detection for a device. For example, some automobiles are equipped with SONAR sensors in the rear bumper so that the automobile may notify the driver if an object is in close proximity while reversing.

Object detection sensors require computing and power resources to capture data. Additionally, a device requires computing and power resources to process the captured data and to control the object detection sensors. As many devices (such as automobiles, airplanes, unmanned aerial vehicles, smartphones, and so on) incorporate object detection sensors, processing resources and power consumption associated with object detection sensors continues to increase.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to methods and apparatuses for determining a characteristic of a device's object detection sensor during use of the sensor. In one example, a device may include an object detection sensor oriented in a first direction. The device may also include one or more processors. The device may further include a memory coupled to the one or more processors, the memory including one or more instructions that, when executed by the one or more processors, cause the device to: determine a direction of travel for the device, compare the direction of travel to the first direction to determine a magnitude of difference, and determine a characteristic of the object detection sensor based on the magnitude of difference.

In another example, a method for determining a characteristic of a device's object detection sensor oriented in a first direction may include determining a direction of travel for the device. The method may further include comparing the direction of travel to the first direction to determine a magnitude of difference. The method may also include determining a characteristic of the object detection sensor based on the magnitude of difference.

In a further example, a non-transitory computer-readable storage medium for determining a characteristic of a device's object detection sensor oriented in a first direction is disclosed. The storage medium may store one or more programs containing instructions that, when executed by one or more processors of a device, cause the device to perform operations including determining a direction of travel for the device. Operations may further include comparing the direction of travel to the first direction to determine a magnitude of difference. Operations may also include determining a characteristic of the object detection sensor based on the magnitude of difference.

In another example, a device for determining a characteristic of an object detection sensor oriented in a first direction may include means for using the object detection sensor during operation of the device. The device may also include means for determining a direction of travel of the device. The device may further include means for comparing the direction of travel to the first direction to determine a magnitude of difference. The device may also include means for determining a characteristic of the object detection sensor based on the magnitude of difference.

BRIEF DESCRIPTION OF THE DRAWINGS

The disclosure herein is illustrated by way of example, and not by way of limitation, in the figures of the accompanying drawings and in which like reference numerals refer to similar elements.

FIG. 1A is an illustration depicting a side view of a device including multiple object detection sensors, in accordance with some aspects of the present disclosure.

FIG. 1B is an illustration depicting a bottom up view of the device including the multiple object detection sensors shown in FIG. 1A.

FIG. 1C is an illustration depicting a top down view of another device including multiple object detection sensors, in accordance with some aspects of the present disclosure.

FIG. 1D is an illustration depicting a side view of the device including the multiple object detection sensors shown in FIG. 1C.

FIG. 2C is an illustration depicting additional object detection sensors on the generic device shown in FIG. 2A oriented along the plane of capture.

FIG. 2D is an illustration depicting example fields of capture and directions of capture for the object detection sensors shown in FIG. 2C.

DETAILED DESCRIPTION

Figure 1E:
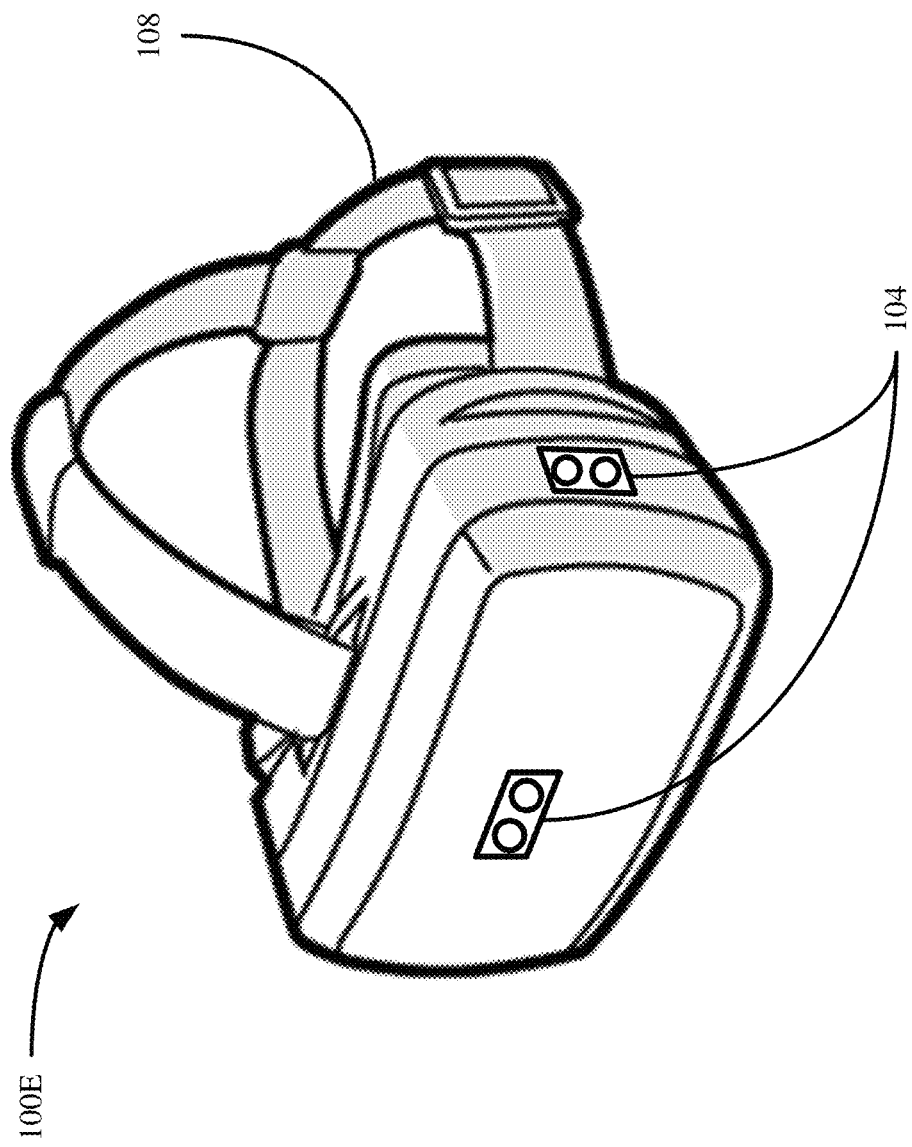
FIG. 1E is an illustration depicting another device including multiple object detection sensors, in accordance with some aspects of the present disclosure.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Example object detection sensors may include monocular cameras, stereoscopic cameras, infrared cameras, time of flight cameras, range finders, SONAR sensors, RADAR sensors, and laser sensors/scanners. Such object detection sensors may be used to determine a distance between the sensor and an object within the sensor's field of capture. For example, a stereoscopic camera captures multiple images at the same time from different vantages. The captured images from different vantages may be compared to determine a "depth" of an object captured in the multiple images (i.e., an indication of the distance between the camera and the object).

For example, unmanned aerial vehicles (such as aerial drones and quadcopters) may use object detection sensors for obstacle detection and avoidance. FIG. 1A is an illustration 100A depicting a side view of an example unmanned aerial vehicle (UAV) 102 including a plurality of object detection sensors 104. FIG. 1B is an illustration 100B depicting a bottom up view of the example unmanned aerial vehicle 102 including the plurality of object detection sensors 104. In the example configuration of object detection sensors 104, the unmanned aerial vehicle 102 may use the object detection sensors 104 to detect obstacles while traveling along a plane parallel with the earth's horizon. Additional object detection sensors may also exist to detect obstacles above and/or below the unmanned aerial vehicle 102.

In another example, automobiles may be equipped with object detection sensors (such as SONAR sensors and/or backup cameras) to detect obstacles while reversing. An automobile may be further equipped with object detection sensors around the body of the automobile (including the rear) for obstacle detection in directions other than reverse. FIG. 1C is an illustration 100C depicting a top down view of an example automobile 106 including a plurality of object detection sensors 104. FIG. 1D is an illustration 100D depicting a rear view of the example automobile 106. In the example configuration of object detection sensors 104 for an automobile 106, the object detection sensors 104 may be used to, for example, alert a driver or occupant of the automobile 106 of an obstacle, override user operation to avoid an obstacle (such as braking in emergency situations, lane deviation adjustment, and so on), and assist in operating an automobile 106 for self-driving.

In a further example, virtual reality headsets or virtual reality devices (such as a smartphone used within a virtual reality headset), where a user is removed or inhibited from sensing the physical world (such as sight as a result of wearing a VR headset and hearing as a result of wearing headphones), may include object detection sensors to identify a potential obstacle in order to assist a user in avoiding obstacles while moving. FIG. 1E is an illustration 100E depicting an example virtual reality headset 108 including a plurality of object detection sensors 104. An example orientation of the object detection sensors 104 may include one or more object detection sensors 104 located on a front of the headset 108, one or more object detection sensors 104 located on a left side of the headset 108, and one or more object detection sensors 104 located on a right side of the headset 108. In the example configuration of object detection sensors 104 for the virtual reality headset 108, the object detection sensors 104 may be used to identify an obstacle. Once an obstacle is identified, the user is notified of the approaching obstacle by rendering an obstacle in the user's field of capture within the virtual reality experience and/or providing an audible notification for the obstacle.

While a plurality of example devices that may include or be coupled to one or more object detection sensors 104 are illustrated in FIG. 1A-FIG. 1E, the present disclosure is not limited to the illustrated examples or a specific device, and aspects of the present disclosure may relate to any periodically moving or moveable device (such as boats, aircraft, tractors, wireless communication devices, headphones, and so on).

In some aspects, the object detection sensors 104 are positioned to detect obstacles in an axis of travel or plane of travel of the device. For example, a car does not change height in relation to the ground and does not roll, pitch, or yaw in relation to the ground. Thus, the car has one plane of travel approximately parallel to the ground. Object detection sensors 104 may be positioned on the car to detect obstacles in the one plane of travel. Orienting the object detection sensors 104 to detect obstacles in a plane of travel may comprise positioning or orienting the object detection sensors 104 so that the direction of capture for each object detection sensor 104 aligns approximately with the plane of travel. As a result, the plane of travel may also be a "plane of capture" in which objects are detected.

Figure 2B:
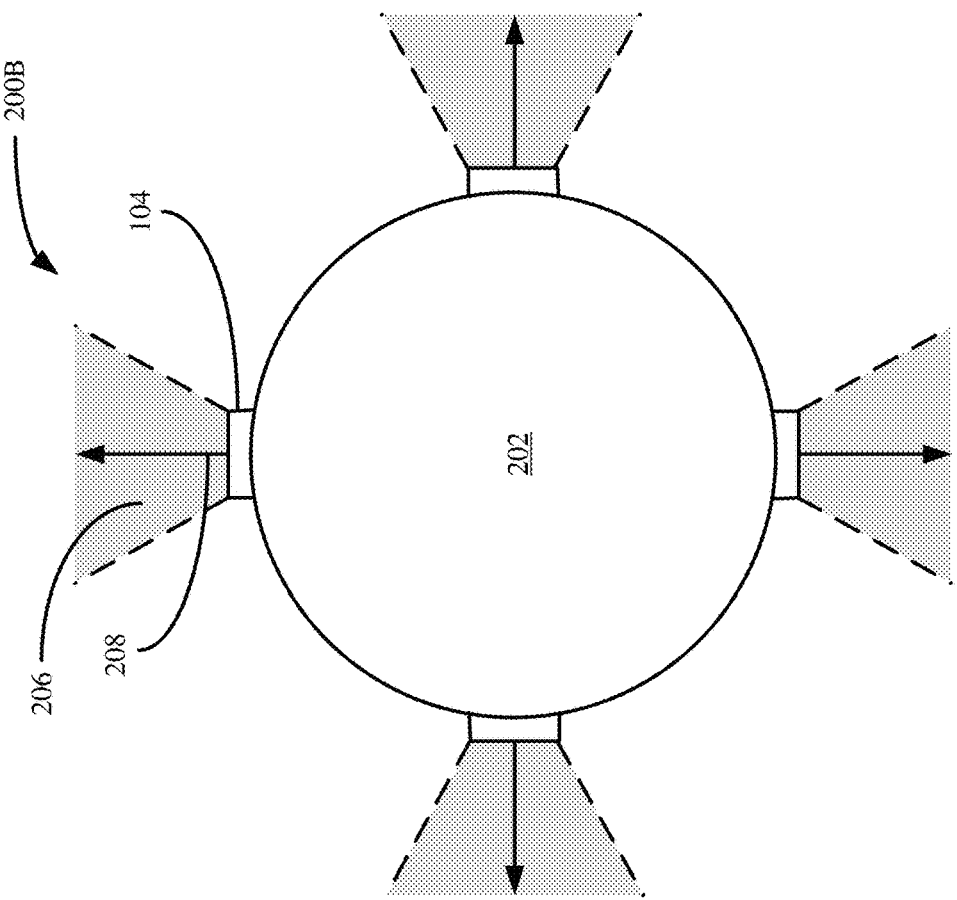
FIG. 2B is an illustration depicting example fields of capture and directions of capture for the object detection sensors shown in FIG. 2A.
Figure 2A:
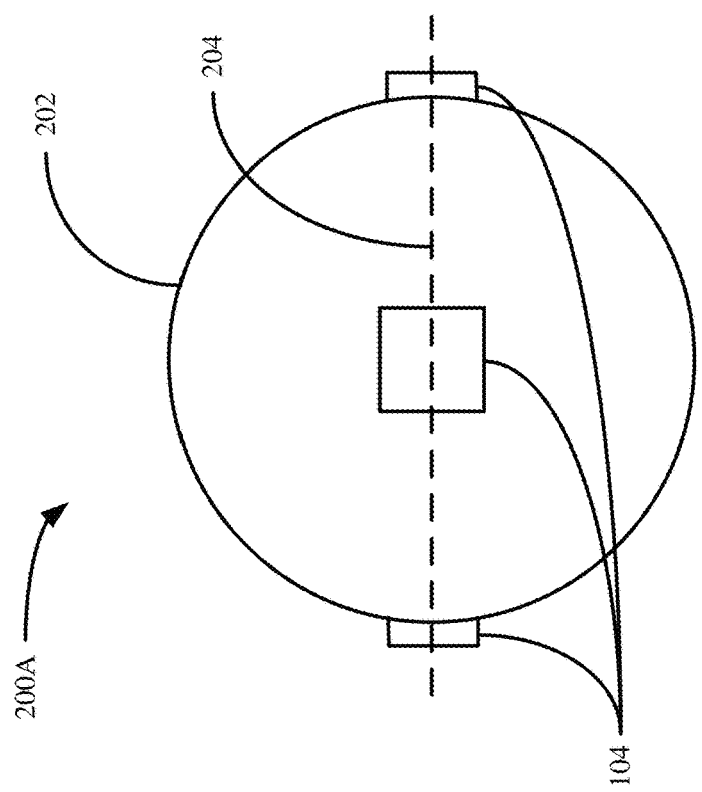
FIG. 2A is an illustration depicting multiple object detection sensors on a generic device oriented along one plane of capture.

FIG. 2A is an illustration 200A depicting an example orientation of multiple object detection sensors 104 on a generic device 202 along one plane of capture 204. While the object detection sensors 104 are illustrated as oriented along the plane of capture 204, the object detection sensors 104 may otherwise be positioned as long as each object detection sensor's field of capture covers a portion of the plane of capture 204. FIG. 2B is an illustration 200B depicting an example field of capture 206 and an example direction of capture 208 of each object detection sensor 104 of the generic device 202 shown in FIG. 2A. If device 202 is a car, then FIG. 2A illustrates a side view of the car with object detection sensors 104 positioned at the front, back and both sides of the car. Continuing with the example of a car, FIG. 2B illustrates a top down view of the car shown in FIG. 2A and also illustrates the field of capture 206 and direction of capture 208 for the object detection sensor 104 on each side of the car.

While one object detection sensor 104 per side is illustrated in the examples in FIG. 2A and FIG. 2B, any number of object detection sensors 104 may be positioned any distance from one another. FIG. 2C is an illustration 200C depicting the generic device 202 shown in FIG. 2A including additional object detection sensors 104 oriented along the one plane of capture 204. FIG. 2D is an illustration 200D depicting an example field of capture 206 and example direction of capture 208 of each object detection sensor 104 of the generic device 202 shown in FIG. 2C. Again continuing with the example of a car, object detection sensors may be positioned along the corners of a bumper in order to observe more of the plane of travel for the car (such as if an object is in close proximity while the car is turning into a parking space).

Figures 2E, 2F:
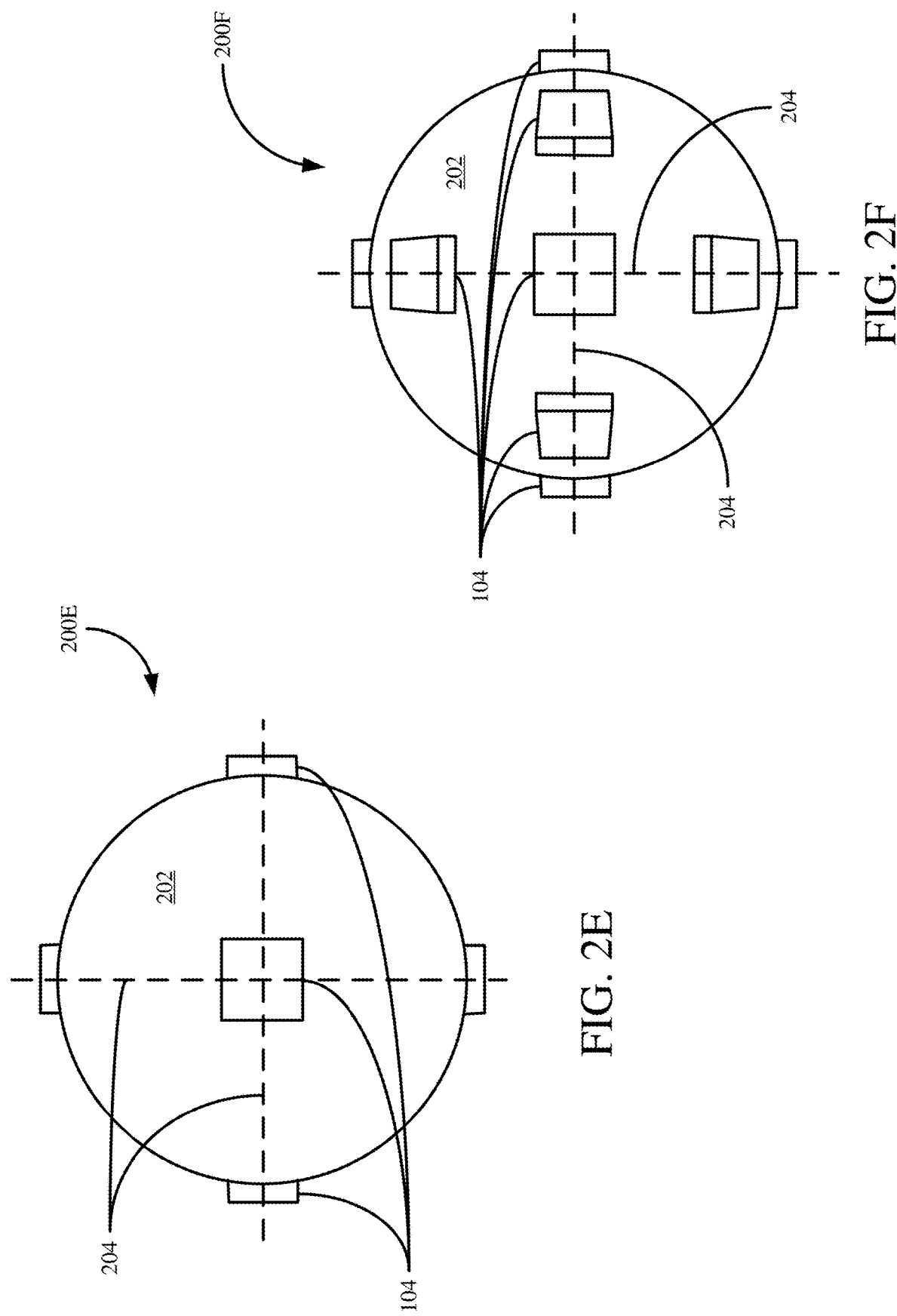
FIG. 2E is an illustration depicting additional object detection sensors on the generic device shown in FIG. 2A oriented along an additional plane of capture.
FIG. 2F is an illustration depicting additional object detection sensors on the generic device shown in FIG. 2E along both planes of capture.
Figure 2G:
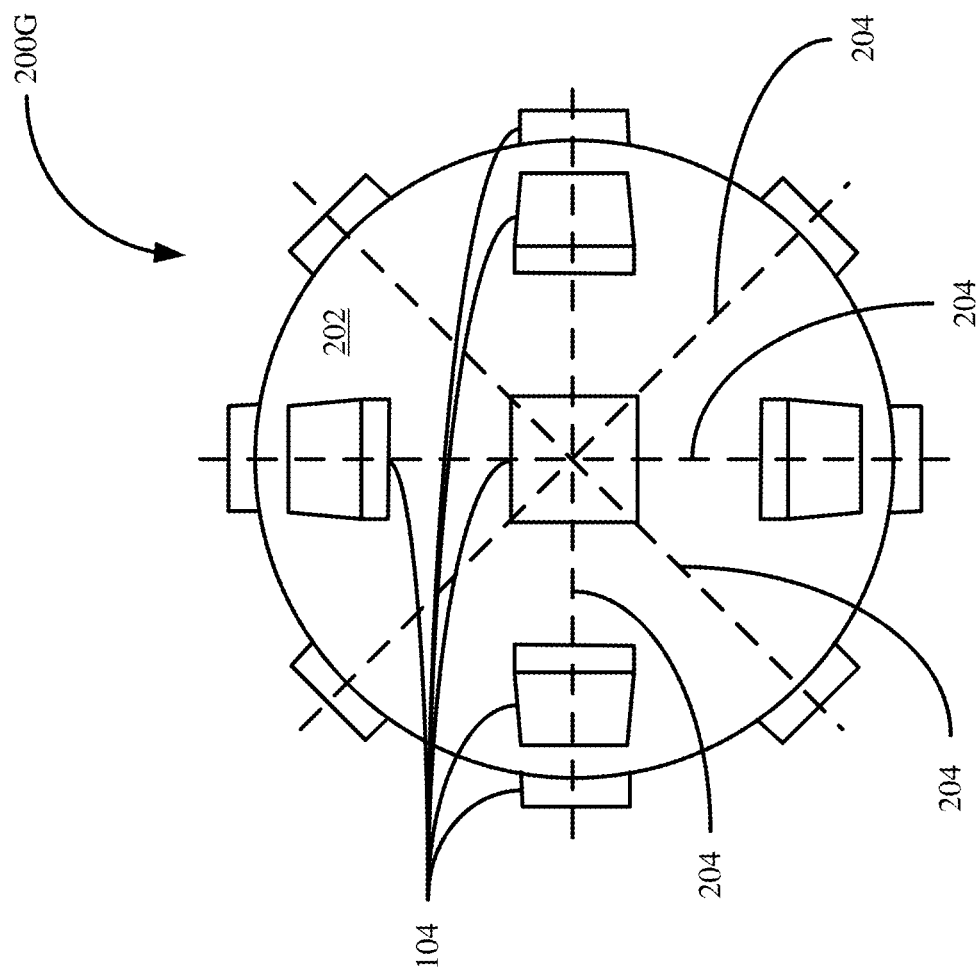
FIG. 2G is an illustration depicting additional object detection sensors on the generic device shown in FIG. 2F along further planes of capture.

Many devices have more than one plane of travel. For example, a crane at shipping ports (which places containers onto flatbeds of shipping trucks) may move in any direction horizontal to the ground as well as up and down in order to lift and lower containers. Therefore, the crane moves within a three dimensional space that may be defined by two planes of travel: a plane parallel to the ground (similar to a car) and a plane perpendicular to the ground (the plane defining lifting and lowering the containers). FIG. 2E is an illustration 200E depicting an example orientation on the generic device 202 shown in FIG. 2A of multiple object detection sensors 104 along two planes of capture 204. FIG. 2F is an illustration 200F depicting the generic device 202 shown in FIG. 2E with additional object detection sensors 104 along the two planes of capture 204. Some devices (such as aerial drones and other aircraft), in addition to moving in a three dimensional space, also may roll, pitch, and/or yaw when moving. FIG. 2G is an illustration 200G depicting an example orientation on the generic device 202 shown in FIG. 2F with additional object detection sensors 104 along additional planes of capture 204.

While some example orientations of object detection sensors are illustrated, object detection sensors may be positioned in any manner suitable for detecting obstacles to a device's movement. Furthermore, while direction of capture is illustrated as static relative to an object detection sensor, some sensors may have a variable direction of capture. For example, some laser scanners use mirrors to change the direction of the laser emitting from the scanner (such as bar code scanners). Additionally, while geometric planes are used in describing capturing information by object detection sensors and movement by devices, some devices may move freely in a three dimensional space and some sensors may capture information outside of specific planes. For example, airplanes and quadcopters may move freely in three dimensional space, some cameras may have a wide field of capture, and some laser scanners may have a variable direction of capture. Therefore, the present disclosure should not be limited to the provided examples.

As many devices incorporate object detection sensors and the amount of information captured by object detection sensors increases, conserving processing resources and power consumption while still operating an object detection sensor may be needed. A device may determine (such as adjusting) various aspects of an object detection sensor to reduce its computing resources or power consumption. For a SONAR sensor, the device may determine a speaker transmit power, which impacts the sounding range. The device may additionally or alternatively determine the sounding frequency. For a RADAR sensor, the device may determine an antenna power, which impacts the ability to receive wireless signals. For a laser sensor, the device may determine a transmit power for the laser emitter, may determine the frequency of the laser, may determine the movement of the laser by the scanner, and/or may determine the strobe frequency of the emitter. For a LIDAR sensor, the device may determine the frequency of the laser and/or may determine the transmit power for the laser emitter. For a camera (such as a monocular camera, a stereoscopic camera, an infrared camera, a time of flight camera, a range finder, and so on), the device may determine the frame capture rate (frame rate), the image resolution, and the color depth or palette (if capturing visible light). For a stereoscopic camera (which may include multiple monocular cameras), the device may also determine the number of cameras to use in capturing frames (such as using one camera or using two cameras). Additionally, if the multiple cameras for the stereoscopic camera are not equivalent, the device may determine which camera to use (if not to use both). For example, one camera may be used in lieu of the other camera based on better resolution, better low light image capture, less power consumption, and so on.

In addition or alternative to controlling aspects of the object detection sensor, the device may determine how to process the information captured by an object detection sensor. For example, the device may sometimes discard some captures (such as every other capture) to conserve computing resources. In another example, the device may only partially process captured information. Thus, the device may determine the frequency for processing information captured by an object detection sensor and/or determine which portion of the captured information to be processed by the device.

Information captured by an object detection sensor is of more relevance in obstacle detection at certain times than others. For example, when the device is a car, information from a backup camera is more relevant in obstacle detection for the car while reversing than while driving forward or in park. In another example, when the device is a virtual reality headset, information captured by an object detection sensor on the front of a virtual reality headset is more relevant in obstacle detection for the user while walking forward than while sitting or being stationary. In yet another example of a drone quadcopter, information captured by a forward facing object detection sensor is more relevant in obstacle detection for the drone when moving forward than while moving up or down, pitching, yawing, or rolling. In addition, information captured by a forward facing object detection sensor may be least relevant when moving backwards.

A device may determine its motion using one or more motion sensors, including one or more accelerometers, one or more gyroscopes, one or more compasses, one or more pressure sensors, and one or more global positioning systems (GPS). Device motion information may be used to determine or adjust capture aspects of the object detection sensor and/or determine or adjust how to process captured information from an object detection sensor. For example, if a device is moving in a direction similar to a direction of capture for a camera on the device (such as while a car is backing up and using a backup camera), the camera may be adjusted to have a higher frame capture rate (such as 30 frames per second) than if the device is moving in a different direction (such as 5 frames per second when the car is driving forward or in park). In another example, the image capture resolution may be increased if the device is moving in the direction similar to the direction of capture for the camera and decreased if the device is moving in a different direction than the direction of capture.

Co-pending U.S. patent application Ser. No. 15/224,904, titled "System and Method of Dynamically Controlling Parameters for Processing Sensor Output Data for Collision Avoidance and Path Planning", filed Aug. 1, 2016 and issued as U.S. Pat. No. 10,126,722 on Nov. 13, 2018, describes adjusting a sampling rate of a sensor on a vehicle based on the direction of travel of the vehicle. This co-pending application is hereby incorporated by reference in its entirety.

In addition to determining a characteristic of an object detection sensor based on a direction of travel of a device, determining characteristics of an object detection sensor also may be based on a magnitude of difference (such as a degree of difference) between the direction of travel and the direction of capture for the object detection sensor. Determinations further may be based on one or more predictions about future motion of the device. For example, if a car senses it is decelerating while driving forward, the car may increase the frame rate of the backup camera in predicting that the reverse direction may become more relevant to obstacle avoidance. In one aspect of predicting future motion, the device may determine its trajectory. If the device determines its trajectory will bring the device's future direction of travel closer to the object detection sensor's direction of capture, the device may use a predicted future direction of travel or the trajectory to determine the characteristic for the one or more of the object detection sensors.

In some aspects of the present disclosure, the device may determine a density or number of objects in the device's environment, which may be used to determine the characteristic of the object detection sensor. If the density of objects increases, there may be a higher likelihood of an object being an obstacle to the device's motion. Therefore, the device may mitigate an adjustment to an object detection sensor even if the direction of capture does not substantially align with the device's direction of travel. For example, where the device is a self-driving car, if there are other automobiles surrounding the car on the road, the device may determine to reduce a frame rate of a rear camera by a smaller magnitude than if the car would be alone on the road.

In some example implementations, one or more object detection sensors of the device are used to determine the density of objects in the device's environment. Thus, an object detection sensor's adjustment may be mitigated based on captures from one or more other object detection sensors as well as its own captures. In other example implementations, mitigation of adjustments to an object detection sensor may be based solely on information captured by that object detection sensor.

In some further aspects of the present disclosure, the characteristic of the object detection sensor may be based on whether the device has identified an object in the device's environment as a potential obstacle. In determining if an object is a potential obstacle, the device may use information captured from one or more object detection sensors to determine the potential for a future collision between the object and the device. For example, the device, in using captures from one or more object detection sensors, may determine that an object is moving in relation to its environment and the device. The device may determine one or more of the object's direction of travel relative to the device, the object's speed of travel relative to the device, and the object's trajectory relative to the device. In some example implementations, the object's direction of travel and speed can be compared to the device's direction of travel and speed to determine a probability for collision. Additionally or alternatively, the device may compare the object's trajectory to the device's trajectory to determine a probability for collision. In determining a probability for collision, the device may use a margin of error in comparing trajectories and/or directions of travel and speeds. The margin of error may account for possible changes in acceleration of the object or the device, possible changes in direction or trajectory of the object or the device, and/or estimation errors from determining an object's movement.

In an example of identifying an object as a potential obstacle, if the device is a quadcopter drone and another aerial vehicle is in the drone's environment during flight, a stereoscopic camera may capture an image of the vehicle and use successive captures to determine a direction of travel and speed of the vehicle relative to the drone. The drone may then compare the vehicle's direction of travel and speed to the drone's direction of travel and speed to determine a possibility of collision between the vehicle and drone. In comparing directions of travel and speeds, the device may use a margin of error to account for the vehicle and/or the drone potentially changing trajectories by, e.g., a defined degree of freedom (such as up to 10 degrees of difference from the current direction of travel, 10 percent difference in speed of the device and object, and so on).

If the device identifies an object as a potential obstacle, the device may enable the one or more object detection sensors capturing information about the object to operate in an increased manner. As a result, the device may have better fidelity in tracking the object and optionally taking any actions for avoiding the potential obstacle. For example, if a camera's frame rate is to be reduced to 5 frames per second from 30 frames per second as a result of comparing the device's direction of travel to the camera's direction of capture, but the camera captures an object that the device identifies as a potential obstacle, the device may determine to keep the camera's frame rate at 30 frames per second while tracking the object. Additional processes and examples of operating an object detection sensor are described below.

Figure 3:
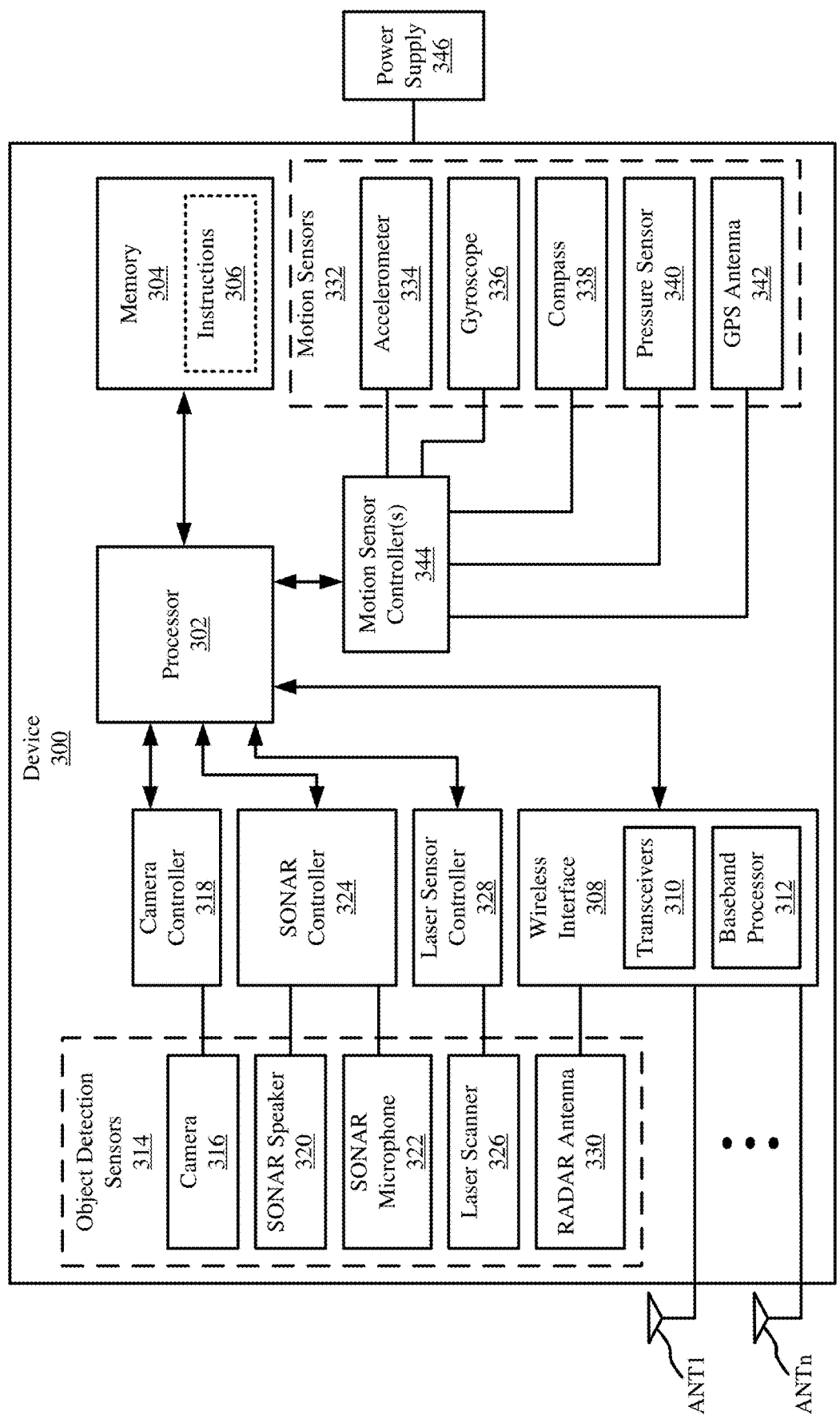
FIG. 3 is a block diagram of an example device, in accordance with some aspects of the present disclosure.

FIG. 3 is a block diagram of an example device 300 (such as one of the devices shown in FIGS. 1A-E) that may be used to perform aspects of the present disclosure. The device 300 may be any suitable device capable of capturing information using an object detection sensor, including, for example, wireless communication devices (such as camera phones, smartphones, tablets, dash cameras, laptop computers, desktop computers, and so on), automobiles, construction equipment, aircraft (such as airplanes, helicopters, drones, and so on), and seacraft (such as ships, submarines, buoys, and so on). The device 300 is shown in FIG. 3 to include a processor 302, a memory 304 storing instructions 306, a wireless interface 308 coupled to antennas ANT1-ANTn, one or more object detection sensors 314 (such as a camera 316, a SONAR speaker 320 and SONAR microphone 322, a laser scanner 326, and/or a RADAR antenna 330), a camera controller 318 coupled to the camera 316, a SONAR controller 324 coupled to the SONAR speaker 320 and the SONAR microphone 322, a Laser Sensor Controller 328 coupled to the laser scanner 326, one or more motion sensors 332 (such as an accelerometer 334, a gyroscope 336, a compass 338, a pressure sensor 340, and a GPS antenna 342), and one or more motion sensor controllers 344 coupled to the one or more motion sensors 332. The device 300 may also include a power supply 346, which may be coupled to or integrated into the device 300.

The processor 302 may be any suitable one or more processors capable of executing scripts or instructions of one or more software programs (such as instructions 306) stored within memory 304. In some aspects of the present disclosure, the processor 302 may be one or more general purpose processors that execute instructions 306 to cause the device 300 to perform any number of different functions or operations. In additional or alternative aspects, the processor 302 may include integrated circuits or other hardware to perform functions or operations without the use of software. While shown to be coupled to each other via the processor 302 in the example of FIG. 3, the processor 302, memory 304, object detection sensors 314, camera controller 318, SONAR controller 324, laser sensor controller 328, wireless interface 308, and one or more motion sensor controllers 344 may be coupled to one another in various arrangements. For example, the processor 302, memory 304, object detection sensors 314, camera controller 318, SONAR controller 324, laser sensor controller 328, wireless interface 308, and one or more motion sensor controllers 344 may be coupled to each other via one or more local buses (not shown for simplicity).

The camera controller 318 may include one or more image signal processors to process captured image frames or video provided by the camera 316. A SONAR controller 324 and laser sensor controller 328 may also include one or more processors to process the information captured by the SONAR microphone 322 and the laser scanner 326, respectively.

The wireless interface 308 may include at least a number of transceivers 310 and a baseband processor 312. The transceivers 310 may be coupled to antennas ANT1-ANTn. In some aspects, the device 300 may include an antenna selection circuit (not shown for simplicity) that can selectively couple the transceivers 310 to different antennas ANT1-ANTn. The transceivers 310 may be used to transmit signals to and receive signals from other devices including, for example, an access point, a base station, other wireless communication devices, and so on. Although not shown in FIG. 3 for simplicity, the transceivers 310 may include any number of transmit chains to process and transmit signals to other devices via antennas ANT1-ANTn, and may include any number of receive chains to process signals received from antennas ANT1-ANTn.

The baseband processor 312 may be used to process signals received from the processor 302 and the memory 304 and to forward the processed signals to transceivers 310 for transmission via one or more of antennas ANT1-ANTn, and may be used to process signals received from one or more of antennas ANT1-ANTn via transceivers 310 and to forward the processed signals to the processor 302 and the memory 304. More specifically, the baseband processor 312, which may be any suitable well-known baseband processor, encodes signals for transmission from the device 300 via the transceivers 310, and decodes signals received from other wireless devices via the transceivers 310. The transmit chains within the transceivers 310 may include mixers to up-convert signals from a baseband frequency to a carrier frequency for transmission from device 300, and the receive chains within the transceivers 310 may include mixers to down-convert received signals from the carrier frequency to the baseband frequency.

The one or more object detection sensors 314 of device 300 may be any number of one or more cameras 316, one or more SONAR sensors (including a SONAR speaker 320 and a SONAR microphone 322), one or more laser scanners 326, and one or more RADAR sensors (including one or more RADAR antennas 330 coupled to the wireless interface 308). While device 300 is illustrated as including at least one of each type of object detection sensor 314, the device 300 may include a subset of the illustrated object detection sensors 314 and their respective controllers. Regarding the RADAR sensor, the wireless interface 308 may process the wireless signals received by RADAR antenna 330. In other example implementations, the wireless interface 308 may use one or more of ANT1-ANTn to receive the wireless signals for RADAR. Device 300 may also include other object detection sensors not shown in FIG. 3. For example, device 300 may include one or more time of flight cameras, one or more range finders, and/or one or more LIDAR systems. Thus, the present disclosure should not be limited to the provided examples.

The one or more motion sensors 332 may include one or more from an accelerometer 334, a gyroscope 336, a compass 338, an atmospheric pressure sensor 340, and a Global Positioning System (including one or more GPS antennas 342 attached to the one or more motion sensor controllers 344). While device 300 is illustrated as including at least one of each type of motion sensor 332, the device 300 may include a subset of the illustrated motion sensors 332.

In some example implementations, processor 302 (in executing instructions 306 stored in memory 304) may compare the device's motion (determined using the one or more motion sensors 332 and motion sensor controller 344) with the direction of capture for an object detection sensor 314 (such as a direction of capture for camera 316), determine an adjustment to one or more characteristics of the object detection sensor 314 (such as the frame rate for camera 316) based on the comparison, and send instructions to the object detection sensor's respective controller (such as camera controller 318 for camera 316) to adjust the one or more characteristics of the sensor 314 during operation.

In some other example implementations, the one or more processors 302 may use the comparison to adjust how to process information captured by the one or more object detection sensors. For example, the one or more processors 302 may determine to reduce processing of sensor captures (such as skipping captures to process, processing only a portion of the captures, and so on) by a magnitude corresponding to a difference between the device's direction of travel relative to the object detection sensor's direction of capture.

The below examples in the disclosure describe adjusting a characteristic of an object detection sensor. However, some aspects of the present disclosure include adjusting processing the captured information from an object detection sensor in addition to or alternative to adjusting a characteristic of the object detection sensor. In describing adjusting a characteristic of an object detection sensor, many of the below examples describe adjusting a frame capture rate for a camera. However, some aspects of the present disclosure include types of sensors other than a camera and characteristics of the sensor for adjustment other than the frame capture rate. Example characteristics that may be adjusted include a power of a RADAR antenna, a transmit power of a speaker of a SONAR sensor, a power of an emitter of a laser sensor or laser scanner, a resolution of a camera, a color depth of a camera, and a number of object detection sensors to be used (for multiple object detection sensors with overlapping directions of capture). Thus, the provided examples are for illustrative purposes, and the present disclosure should not be limited to the provided examples.

Figure 4:
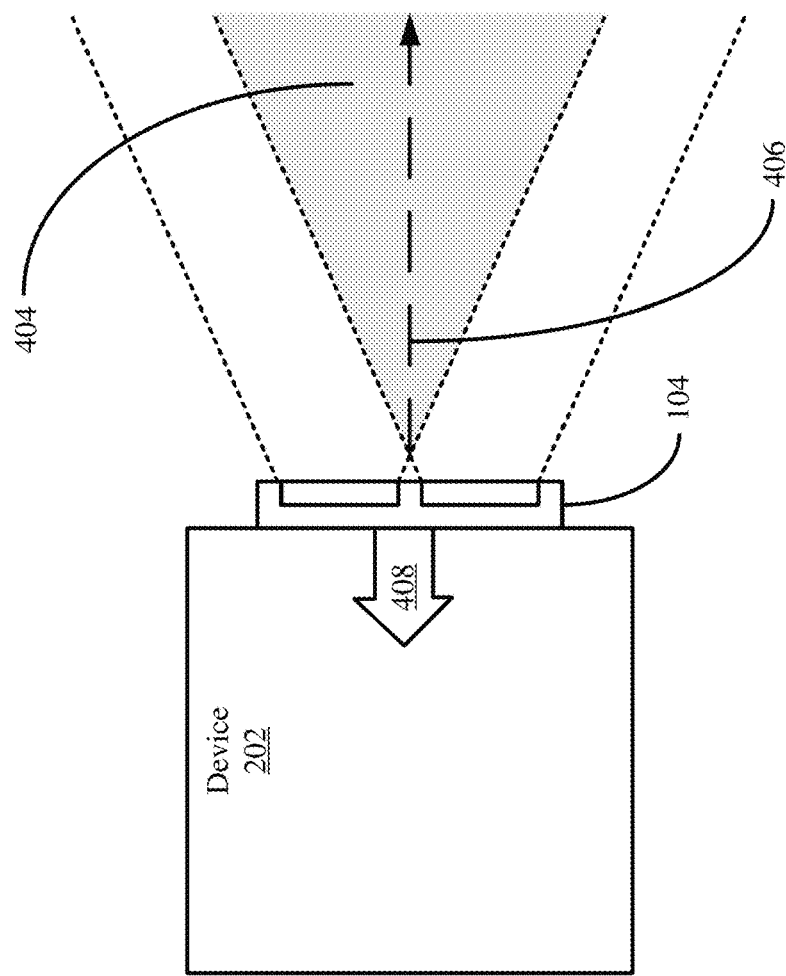
FIG. 4 is an illustration depicting a device with multiple possible directions of travel in one plane of motion and including an object detection sensor, in accordance with some aspects of the present disclosure.
Figure 4:
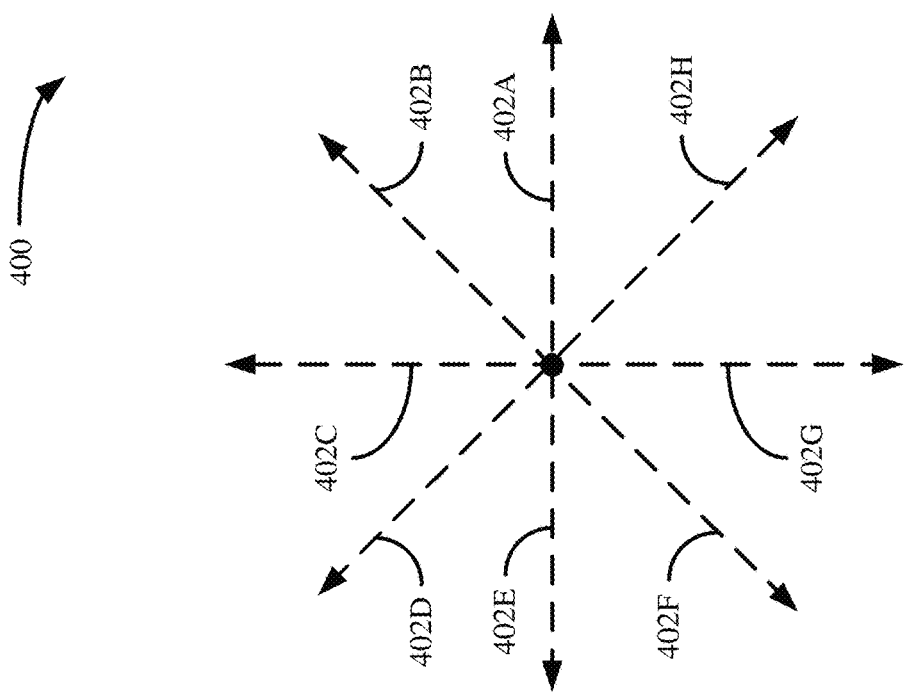

FIG. 4 is an illustration 400 depicting an example device 202 with multiple possible directions of travel 402A-402H in one plane of motion, wherein the device 202 includes an object detection sensor 104 with a field of capture 404 and a direction of capture 406 (as projected onto the one plane of motion). In the example, the object detection sensor 104 is a stereoscopic camera, but the sensor 104 may be of any type (such as any object detection sensor 314 described above). For the camera, the variable capture rate is signified by arrow 408 (such as 5 fps, 15 fps, 30 fps, and so on).

In some aspects of the present disclosure, the device's direction of travel may be used to determine the capture rate 408 for sensor 104. In one example implementation, the capture rate 408 is dependent on a comparison between the sensor's direction of capture 406 and the device's direction of travel (such as directions 402A-402H). For example, if the device's direction of travel is direction 402A (matching the direction of capture 406), then the capture rate 408 for the object detection sensor 104 may be set to a defined highest capture rate (such as the maximum allowable capture rate by the object detection sensor 104). In another example, if the device's direction of travel is direction 402E (approximately opposing the direction of capture 406), then the capture rate 408 for the object detection sensor 104 may be set to a defined lowest capture rate (such as 5 fps). Thus, the object detection sensor 104 might still capture information when the device's direction of travel is direction 402E, but the amount of information collected is less than if the direction of travel is direction 402A. The highest capture rate and/or the lowest capture rate may be defined by the manufacturer, defined by hardware or software limitations of the sensor and/or the device, and/or defined by the device's user.

Figure 5:
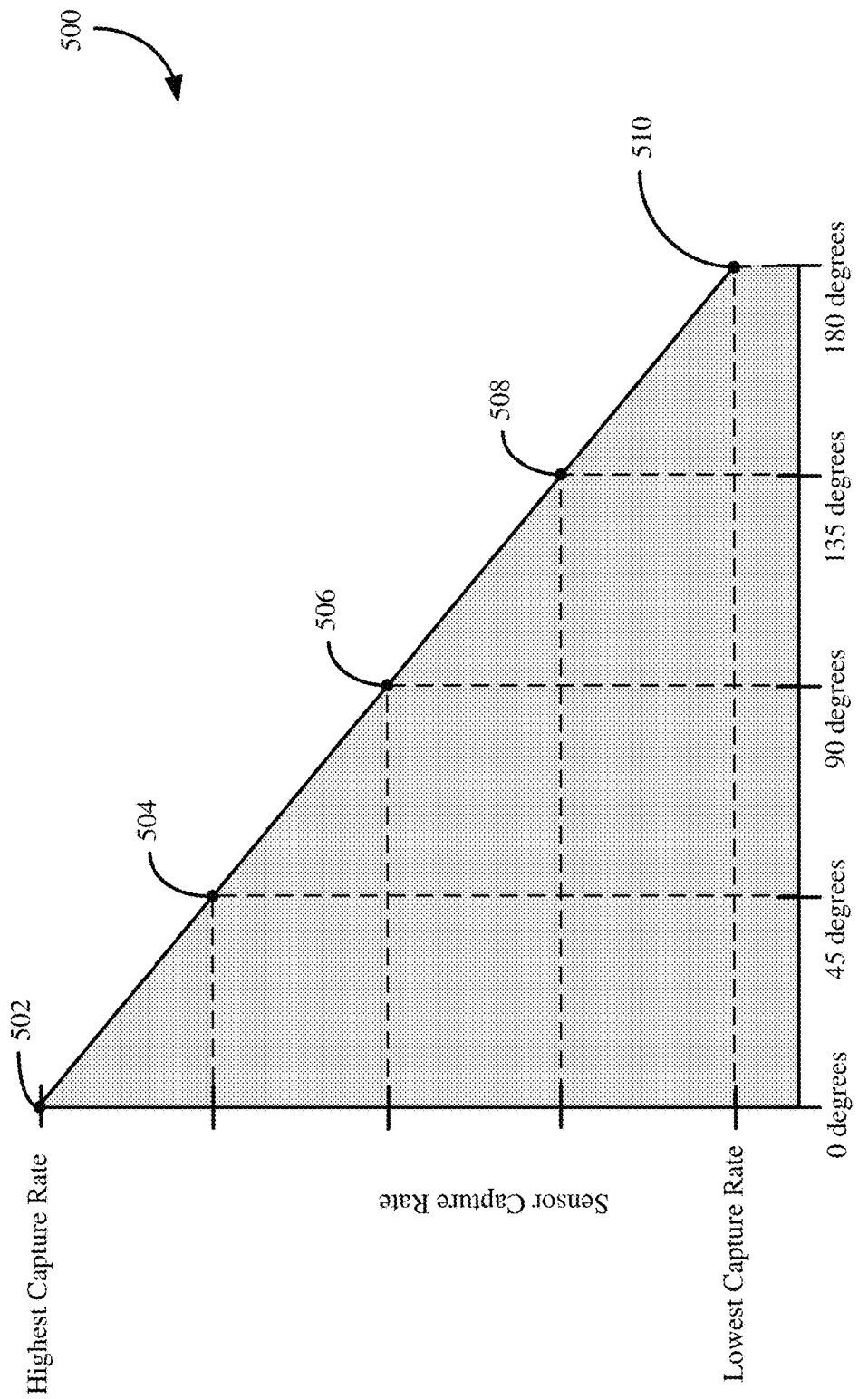
FIG. 5 is an example graph depicting an example change in an object detection sensor's capture rate, in accordance with some aspects of the present disclosure.

If the device's direction of travel is between direction 402A and direction 402E (such as directions 402B-402D or directions 402F-402H), then the capture rate 408 for the object detection sensor 104 may be between the defined lowest capture rate and the highest defined capture rate. In some aspects, the change in capture rate 408 from a lowest capture rate to a highest capture rate may be linear. FIG. 5 is an example graph 500 depicting an example change in capture rate based on the direction of capture 406 as compared to the direction of travel. The vertical axis indicates the capture rate 408 of the object detection sensor 104. The horizontal axis indicates a magnitude of difference between the direction of capture 406 and the direction of travel (such as directions 402A-H). For one plane of travel, the largest difference between the direction of capture 406 and the direction of travel 402E is 180 degrees.

Graph 500 indicates that the capture rate is linearly dependent on the magnitude of difference. Point 502, at zero degrees difference between the direction of travel and the direction of capture (such as directions 402E and 406), illustrates that the object detection sensor capture rate is at its highest defined capture rate. Point 504, at 45 degrees difference (such as directions 402B or 402H and direction 406), shows that the capture rate may be lower than the highest capture rate by a fourth of the difference between the lowest capture rate and the highest capture rate. Point 506, at 90 degrees difference (such as directions 402C or 402G and direction 406), shows that the capture rate may be halfway between the lowest capture rate and the highest capture rate. Point 508, at 135 degrees difference (such as directions 402D or 402F and direction 406), shows that the capture rate may be higher than the lowest capture rate by one fourth of the difference between the lowest capture rate and the highest capture rate. In an illustrative example, if the lowest capture rate 408 is 5 fps and the highest capture rate is 45 fps, then points 502-510 would indicate capture rates of 45, 35, 25, 15, and 5 fps, respectively.

In other aspects of the present disclosure, the capture rate and the magnitude of difference between the direction of travel and the direction of capture may be related in a non-linear fashion. For example, referring back to FIG. 4, the field of capture covers an area/volume of directions wider than the direction of capture. Hence, the object detection sensor 104 of a device 202 with a direction of travel between direction 402B and direction 402H proximal to the direction of capture 406 (such as direction of travel 402A) may be more helpful in determining obstacles than for directions of travel distal to the direction of capture 406. In general, object detection sensor 104 may become more useful in detecting obstacles as the magnitude of difference between direction of capture and direction of travel decreases. Therefore, for degrees of difference, the decrease in capture rate may be lower for a change in degree of difference between, e.g., 0 and 45 degrees than for a change in degree of difference between, e.g., 45 degrees and 90 degrees. In some alternative example implementations, a magnitude of difference related to a change in capture rate may be represented by a polynomial function (such as a first order polynomial function) or a power function.

Figure 6:
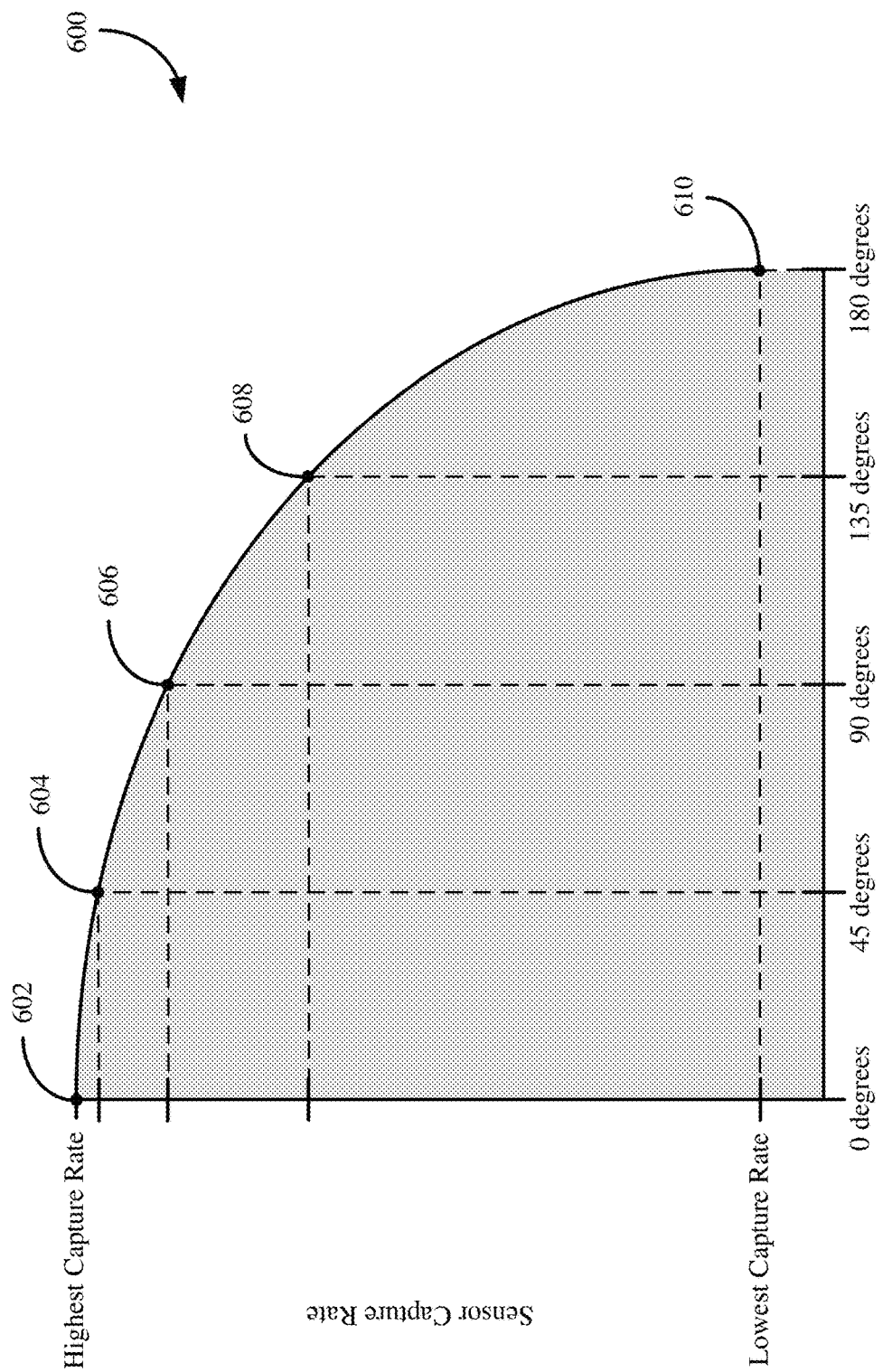
FIG. 6 is an example graph depicting another example change in an object detection sensor's capture rate, in accordance with some aspects of the present disclosure.

FIG. 6 is an example graph 600 depicting another example change in capture rate based on the direction of capture 406 as compared to the direction of travel (such as 402A-402H). As illustrated, the capture rate vs. the magnitude of difference between the direction of capture and the direction of travel is a non-linear relationship (such as defined by a first order function). For graph 600, the difference in object detection sensor capture rates between 0 degrees (point 602) and 45 degrees (point 604) may be less than the difference between 45 degrees (point 604) and 90 degrees (point 606), which may be less than the difference between 90 degrees (point 606) and 135 degrees (point 608), which further may be less than the difference between 135 degrees (point 608) and 180 degrees (point 610).

In some example implementations, the width of the field of capture 404 may affect the rate of change for the object detection sensor capture rate 408. As a result, the slope and/or curvature in graph 600 may vary depending on the width of the object detection sensor's field of capture. For example, the initial rate of change from the highest capture rate may be greater for a narrower field of capture than for a wider field of capture. In another example rate of change for the sensor capture rate, the object detection sensor's capture rate may stay at a fixed capture rate for a span of directions of travel. For example, for directions of travel between direction 402B and direction 402H and direction of capture 406 (indicating a degree of difference to be less than or equal to 45 degrees), the object detection sensor may capture frames at the highest capture rate. When a degree of difference exceeds 45 degrees, the device may then reduce the capture rate dependent on the degree of difference. While some examples of relationships between the capture rate and the difference between the direction of capture and the direction of travel have been provided, any correlation between the sensor capture rate and the magnitude of difference may exist, and embodiments of the disclosure should not be limited to the above illustrative examples.

In some aspects of the present disclosure, the capture rate may also be dependent on the trajectory of the device. For example, the device, using one or more motion sensors, may determine its trajectory or current path traveled. The device may use such information to predict a future direction of travel. The device may thus use the future predicted direction of travel to adjust the object detection capture rate. For example, the device may compare the predicted direction of travel to the direction of capture to determine a magnitude of difference and use the determined magnitude of difference to determine a magnitude of adjustment for the object detection capture rate.

In some additional aspects of the present disclosure, the capture rate may be dependent on the speed or velocity of the device. For example, a slow moving device may have more need for an object detection sensor to detect obstacles in an opposite direction of movement than a fast moving device. One reason may be that moving obstacles (such as other cars, other drones, and so on) may have a better chance to contact a slow moving device from the device's distal end of movement than a faster moving device. Thus, the object detection sensor may have a higher capture rate for a device at a slower velocity than for a device at a faster velocity. In determining the speed, the device may determine a vector or a magnitude. The vector may also be used to determine or predict if the future direction of travel is to change from the current direction of travel.

In additional aspects of the present disclosure, the capture rate may be dependent on an acceleration of the device. In some example implementations, an acceleration may indicate a predicted future velocity that is different than the current velocity. If the sensor capture rate also is dependent on the velocity of the device, the device may use the acceleration to predict and preemptively adjust the capture rate by a magnitude based on the predicted future velocity. For example, if a car is moving at 50 miles per hour and begins to decelerate, the future velocity may be predicted to be, e.g., 35 miles per hour. The car may therefore increase the capture rate of the object detection sensor based on predicting that the velocity is to decrease.

In some other example implementations of using acceleration, an acceleration vector may be used to determine if the direction of travel is to change. For example, if a device is traveling in one direction (such as direction of travel 402E in FIG. 4) and the acceleration vector is 90 degrees to the direction of travel (such as along direction 402C), a predicted future direction of travel may be determined to be somewhere between direction 402C and direction 402E. Thus, the device may preemptively adjust the object detection sensor capture rate dependent on the predicted direction of travel.

In addition or alternative to an object detection sensor's capture rate being dependent on one or more of the device's trajectory, speed, and acceleration, the capture rate may be dependent on a density of objects in the device's environment. A device in an environment with potential obstacles, especially moving objects (such as cars, drones, and so on) may have a need to detect such potential obstacles to determine if there is a possibility of collision and for obstacle avoidance. When more objects exist in the device's environment, there may be a greater chance of a collision between the device and one of the objects.

Figure 7:
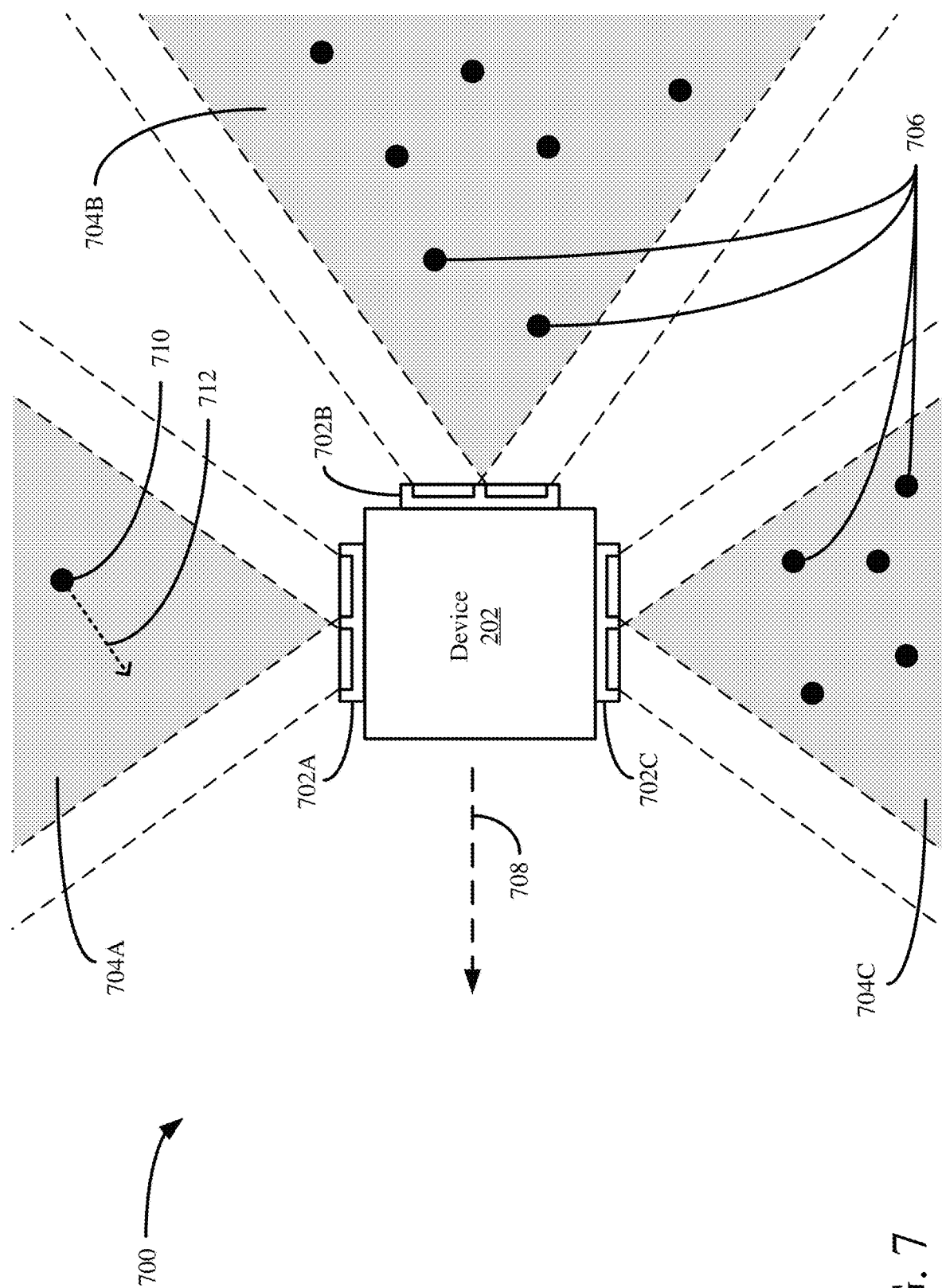
FIG. 7 is an illustration depicting a device with multiple object detection sensors during operation, in accordance with some aspects of the present disclosure.

FIG. 7 is an illustration 700 depicting an example device 202 with multiple object detection sensors 702A, 702B, and 702C with respective fields of capture 704A, 704B, and 704C and capturing a density of objects 706 in the device's environment. The device 202 may determine the number of objects, and if the number of objects is greater than a threshold, the device 202 may adjust the capture rate for one or more of the object detection sensors 702A-702C. In some example implementations, each object detection sensor's capture rate is based on the number of objects 706 captured by that object detection sensor. In some other example implementations, each object detection sensor's capture rate may be based on the number of objects 706 captured by multiple object detection sensors. The threshold for the number of objects may be based on one or more of the speed of device 202, the current capture rate of one or more object detection sensors 702A-702C, the direction of travel, a user defined threshold value, a predefined static value, and so on. Additionally or alternatively, the device may compare the number of objects captured by each object detection sensor in order to adjust the capture rate of the object detection sensors relative to one another. For example, one object is detected in the field of capture 704A for object detection sensor 702A while five objects are detected in the field of capture 704C for object detection sensor 702C. Since the number of objects captured by object detection sensor 702A is less than the number of objects captured by the object detection sensor 702C, the capture rate for object detection sensor 702A may be determined to be reduced more than the capture rate for object detection sensor 702C (independent of the magnitude of difference between the direction of travel and the direction of capture).

An object detection sensor's capture rate also may be dependent on whether an object has been identified as a potential obstacle. Referring back to FIG. 7, the device 202 may have a direction of travel 708. Additionally, the device 202 may determine from captures by the object detection sensor 702A that object 710 has a predicted path of travel 712. For example, the device 202 may compare sequential captures from a stereoscopic camera (which provides a depth measurement) to determine a past movement of the object 710 in order to predict a path of travel 712.

The device 202 may compare the device's direction of travel 708 (optionally including the trajectory, speed and/or acceleration of the device 202) to the predicted path of travel 712 in order to determine if the object 710 may collide with the device 202. In determining a possible collision, the device 202 may use a margin of error for the device's direction of travel 708 and/or the device 202 may use a margin of error for the object's predicted path of travel 712. Thus, if a collision is predicted using a difference in the direction of travel 708 and/or the predicted path of travel 712 within the margin of error, the device 202 may identify the object as a potential obstacle. In identifying an object 710 as a potential obstacle, the device 202 may adjust the capture rate for the object detection sensor 702A. The device 202 may also predict if a different object detection sensor may capture object 710 before a potential collision. If another object detection sensor may capture the object, the device 202 may also adjust the capture rate for that object detection sensor.

In an example of adjusting the capture rate when identifying an object as a potential obstacle and/or based on the density of objects in a device's environment being above a threshold, the device 202 may override a determined capture rate for the object detection sensor and set the capture rate to the highest capture rate for the sensor. In an alternative example of adjusting the capture rate, the device 202 may adjust the rate of change of the capture rate as compared to the magnitude of difference (such as illustrated in FIG. 5 and FIG. 6). In yet another example, the device may use a vote checking system or similar to determine whether to adjust and the magnitude of adjustment for the capture rate of an object detection sensor.

While the above examples are described using one plane of travel and capture, some example implementations apply for multiple planes of travel (and capture). For example, vectors for a direction of travel and direction of capture in a three-dimensional space (which may be defined by two or more planes of travel) may be compared in order to determine a magnitude of difference. Thus, the present disclosure should not be limited to one plane of travel or plane of capture.

Figure 8:
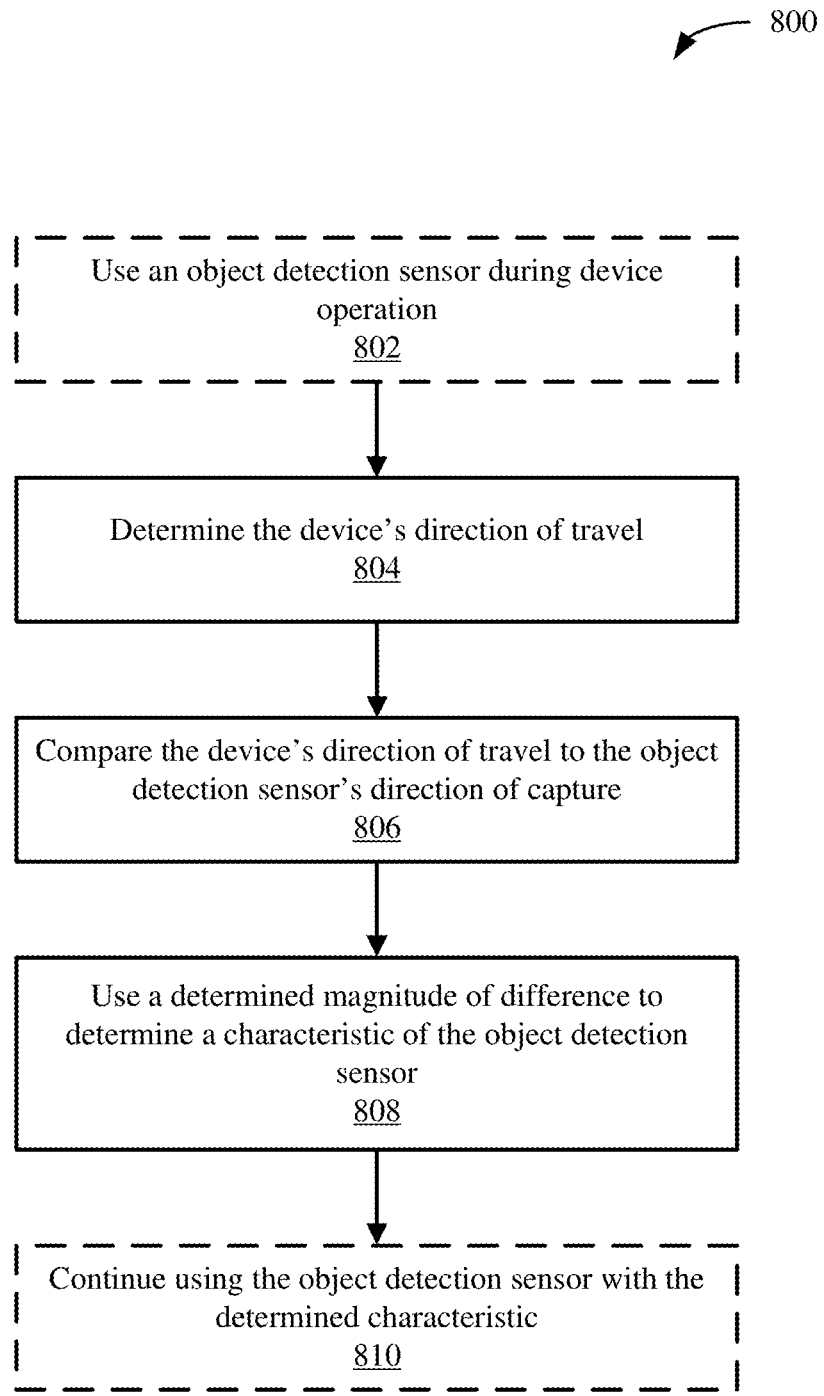
FIG. 8 is an illustrative flow chart depicting an example operation for determining a characteristic of a device's object detection sensor, in accordance with some aspects of the present disclosure.

FIG. 8 is an illustrative flow chart depicting an example operation 800 for a device (such as device 202 in FIG. 2A-FIG. 4 and FIG. 7, device 300 in FIG. 3, and so on) to determine a characteristic of an object detection sensor (such as adjusting the capture rate of camera 702A-702C in FIG. 7, capture rate 408 in FIG. 4, and so on) oriented in a first direction to have a direction of capture (such as direction of capture 406 in FIG. 4, direction 208 in FIG. 2B and FIG. 2D, and so on) during use of the object detection sensor. Beginning at 802, the device may optionally be operating, using an object detection sensor during such operation. For example, referring back to FIG. 4, a device 202 may use stereoscopic camera 104 with a direction of capture 406 and a field of capture 404 to capture frames to be used for identifying possible obstacles to device 202.

Proceeding to 804, the device determines its direction of travel using one or more motion sensors (such as motion sensors 332 in FIG. 3). After determining the device's direction of travel in 804, the device compares the direction of travel to the object detection sensor's direction of capture to determine a magnitude of difference (806). The device may then use the magnitude of difference to determine a characteristic of the object detection sensor (808) by a magnitude based on the magnitude of difference. For example, referring to FIG. 4, the device 202 may adjust a capture rate 408 based on a determined magnitude of difference between the direction of capture 406 and the direction of travel for device 202. In other examples, the device 202 may determine a resolution or color depth for a camera, a transmit power for a laser scanner emitter, a transmit power for a speaker of a SONAR sensor, or a power for a RADAR antenna. Referring back to FIG. 8, the device may optionally continue to use the object detection sensor with the determined characteristic (810). In some aspects of the present disclosure, the process of determining (such as adjusting) a characteristic of the object detection sensor may be repeated as necessary.

As previously described, the determination of a characteristic of the object detection sensor (such as a capture rate of a camera) may be dependent on more than a determined magnitude of difference between the device's direction of travel and the object detection sensor's direction of capture. For example, the characteristic of the object detection sensor further may be dependent on a trajectory of the device, a speed of the device, an acceleration of the device, a density of objects in the device's environment, and/or whether a potential obstacle to the device is identified.

Figure 9:
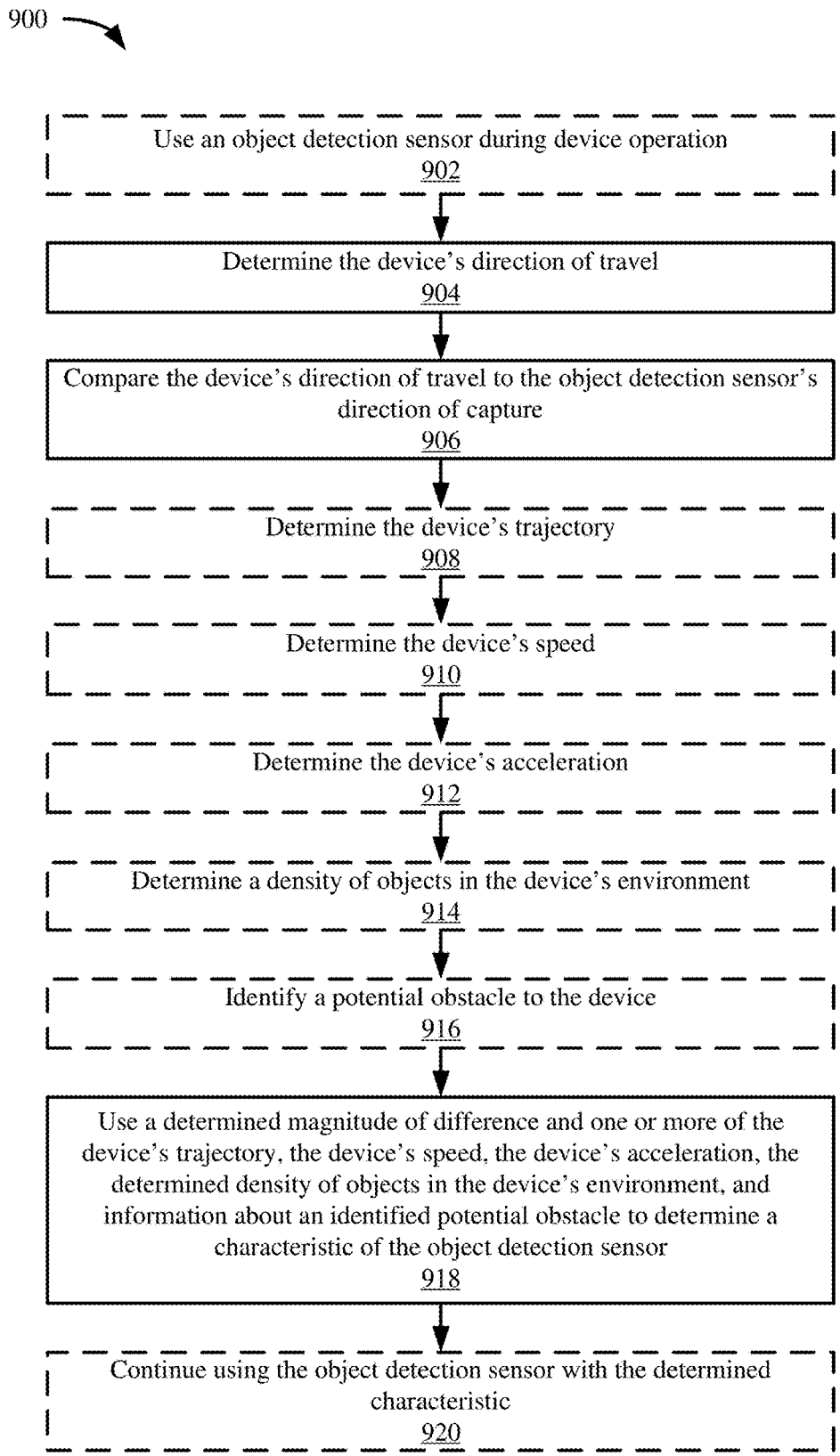
FIG. 9 is an illustrative flow chart depicting another example operation for determining a characteristic of a device's object detection sensor, in accordance with some aspects of the present disclosure.

FIG. 9 is an illustrative flow chart depicting another example operation 900 for a device to determine (such as adjusting) a characteristic of an object detection sensor. Flow chart 900 includes operations similar to those described in illustrative flow chart 800, and further includes additional optional processes during operation of the device. Beginning at 902, the device may optionally be in operation, using an object detection sensor to capture information. Proceeding to 904, the device may determine its direction of travel using one or more motion sensors. The device may then compare the device's direction of travel to the direction of capture for the object detection sensor in order to determine a magnitude of difference (906). The device may also optionally determine one or more of: the device's trajectory (908); the device's speed or velocity (910); the device's acceleration (912); a density of objects in the device's environment (914); and a potential obstacle to the device (916).

Proceeding to 918, the device may thus use the determined magnitude of difference and the one or more determinations from 908-916 to determine a characteristic of the object detection sensor (such as a rate of capture, transmit power, resolution, and so on) by a magnitude dependent on the magnitude of difference and one or more determinations.

The device may then continue to use the object detection sensor with the adjusted characteristic (920).

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as memory 304 in FIG. 3) comprising instructions 306 that, when executed by processor 302, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as processor 302 in FIG. 3. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, 908-916 in FIG. 9, if performed by the device, may be performed in any order and at any frequency. Furthermore, although elements may be described or claimed in the singular, the plural is contemplated unless limitation to the singular is explicitly stated. For example, while one determination or adjustment and determining or adjusting one characteristic of an object detection sensor is described, a characteristic may be determined or adjusted multiple times and multiple characteristics may be determined or adjusted by the device. Accordingly, the disclosure is not limited to the illustrated examples and any means for performing the functionality described herein are included in aspects of the disclosure.

What is claimed is:

1. A device, comprising:
a camera including a first direction of capture and a first frame capture rate; one or more processors; and
a memory coupled to the one or more processors, the memory including one or more instructions that, when executed by the one or more processors, cause the device to:
determine a direction of travel for the device;
compare the direction of travel to the first direction of capture to determine a magnitude of difference; and
adjust the first frame capture rate of the camera to a second frame capture rate based on the magnitude of difference;
wherein determining the direction of travel for the device further comprises:
determining a trajectory of the device; and
predicting a future direction of travel for the device based on the trajectory of the device, wherein the future direction of travel is used as the direction of travel for comparing with the first direction of capture.

2. The device of claim 1, wherein execution of the one or more instructions further cause the device to adjust the first frame rate by a variable amount of adjustment, wherein the variable amount of adjustment is based on the magnitude of difference.

3. The device of claim 1, wherein execution of the one or more instructions cause the device to further:
determine a speed of the device, wherein adjusting the first frame capture rate is further based on the speed of the device.

4. The device of claim 1, wherein execution of the one or more instructions cause the device to further:
determine an acceleration of the device, wherein adjusting the first frame capture rate is further based on the acceleration of the device.

5. The device of claim 1, wherein execution of the one or more instructions further causes the device to perform at least one from the group consisting of:
adjusting a power of a RADAR antenna based on the magnitude of difference;
adjusting a transmit power of a speaker of a SONAR sensor based on the magnitude of difference;
adjusting a sounding frequency of the SONAR sensor based on the magnitude of difference;
adjusting a power of an emitter for a laser sensor based on the magnitude of difference;
adjusting a frequency of a laser of the laser sensor based on the magnitude of difference;
adjusting a movement of the laser of the laser sensor based on the magnitude of difference;
adjusting a strobe frequency of the emitter for the laser sensor based on the magnitude of difference;
adjusting a power of an emitter for a LIDAR sensor based on the magnitude of difference;
adjusting a frequency of a laser of the LIDAR sensor based on the magnitude of difference;
adjusting a color depth of the camera based on the magnitude of difference; and
adjusting a resolution of the camera based on the magnitude of difference.

6. The device of claim 1, wherein execution of the one or more instructions cause the device to further:
determine a density of objects in the device's environment using the camera, wherein adjusting the first frame capture rate is further based on the determined density.

7. The device of claim 1, wherein execution of the one or more instructions cause the device to further:
identify an object as a potential obstacle using one or more captures from the camera, wherein adjusting the first frame capture rate is further based on the identification of the object.

8. The device of claim 7, wherein execution of the one or more instructions cause the device to further:
determine a movement of the identified object, wherein adjusting the frame capture rate is further based on the movement of the identified object.

9. The device of claim 1, wherein execution of the one or more instructions further causes the device to adjust at least one from the group consisting of:
a frequency of processing information captured by the camera based on the magnitude of difference; and
a portion of the information captured by the camera to be processed by the device based on the magnitude of difference.

10. The device of claim 1, wherein the device is a virtual reality headset.

11. A method of operating a camera of a device, wherein the camera includes a first direction of capture and a first frame capture rate, comprising:
determining a direction of travel for the device;
comparing the direction of travel with the first direction of capture to determine a magnitude of difference; and
adjusting the first frame capture rate of the camera to a second frame capture rate based on the magnitude of difference;
wherein determining the direction of travel for the device comprises:
determining a trajectory of the device; and
predicting a future direction of travel for the device based on the trajectory of the device, wherein the future direction of travel is used as the direction of travel for comparing with the first direction of capture.

12. The method of claim 11, wherein adjusting the first frame capture rate comprises adjusting the first frame capture rate by a variable amount of adjustment, wherein the variable amount of adjustment is based on the magnitude of difference.

13. The method of claim 11, further comprising at least one from the group consisting of:
adjusting a power of a RADAR antenna based on the magnitude of difference;
adjusting a transmit power of a speaker of a SONAR sensor based on the magnitude of difference;
adjusting a sounding frequency of the SONAR sensor based on the magnitude of difference;
adjusting a power of an emitter for a laser sensor based on the magnitude of difference;
adjusting a frequency of a laser of the laser sensor based on the magnitude of difference;
adjusting a movement of the laser of the laser sensor based on the magnitude of difference;
adjusting a strobe frequency of the emitter for the laser sensor based on the magnitude of difference;
adjusting a power of an emitter for a LIDAR sensor based on the magnitude of difference;
adjusting a frequency of a laser of the LIDAR sensor based on the magnitude of difference;
adjusting a color depth of a camera based on the magnitude of difference; and
adjusting a resolution of the camera based on the magnitude of difference.

14. The method of claim 11, further comprising:
determining a density of objects in the device's environment using the camera, wherein adjusting the first frame capture rate is further based on the density.

15. The method of claim 11, further comprising:
identifying an object as a potential obstacle using one or more captures from the camera, wherein adjusting the first frame capture rate is further based on the identification of the object.

16. The method of claim 15, further comprising:
determining a movement of the identified object, wherein adjusting the first frame capture rate is further based on the movement of the identified object.

17. The method of claim 11, further comprising at least one from the group consisting of:
adjusting a frequency of processing information captured by the camera based on the magnitude of difference; and
adjusting a portion of the information captured by the camera to be processed by the device based on the magnitude of difference.

18. A non-transitory computer-readable storage medium storing one or more programs containing instructions that, when executed by one or more processors of a device, cause the device to perform operations comprising:
determining a direction of travel of the device, the device having a camera including a first direction of capture and a first frame capture rate;
comparing the direction of travel to the first direction of capture to determine a magnitude of difference; and
adjusting the first frame capture rate of the of the camera to a second frame capture rate based on the magnitude of difference;
wherein determining the direction of travel for the device causes the device to perform operations further comprising:
determining a trajectory of the device; and
predicting a future direction of travel for the device based on the trajectory of the device, wherein the future direction of travel is used as the direction of travel for comparing to the first direction of capture.

19. The non-transitory computer-readable storage medium of claim 18, wherein execution of the instructions to adjust the first frame capture rate causes the device to perform operations further comprising adjusting the first frame capture rate by a variable amount of adjustment, wherein the variable amount of adjustment is based on the magnitude of difference.

20. The non-transitory computer-readable storage medium of claim 18, wherein execution of the instructions causes the device to perform operations further comprising at least one from the group consisting of:
determining a speed of the device, wherein adjusting the first frame capture rate is further based on the speed of the device; and
determining an acceleration of the device, wherein adjusting the first frame capture rate is further based on the acceleration of the device.

21. The non-transitory computer-readable storage medium of claim 18, wherein execution of the instructions further causes the device to perform operations comprising at least one from the group consisting of:
adjusting a power of a RADAR antenna based on the magnitude of difference;
adjusting a transmit power of a speaker of a SONAR sensor based on the magnitude of difference;
adjusting a sounding frequency of the SONAR sensor based on the magnitude of difference;
adjusting a power of an emitter for a laser sensor based on the magnitude of difference;
adjusting a frequency of a laser of the laser sensor based on the magnitude of difference;
adjusting a movement of the laser of the laser sensor based on the magnitude of difference;
adjusting a strobe frequency of the emitter for the laser sensor based on the magnitude of difference;
adjusting a power of an emitter for a LIDAR sensor based on the magnitude of difference;
adjusting a frequency of a laser of the LIDAR sensor based on the magnitude of difference;
adjusting a color depth of a camera based on the magnitude of difference; and
adjusting a resolution of the camera based on the magnitude of difference.

22. The non-transitory computer-readable storage medium of claim 18, wherein execution of the instructions causes the device to perform operations further comprising:
determining a density of objects in the device's environment, wherein adjusting the first frame capture rate is further based on the density.

23. The non-transitory computer-readable storage medium of claim 18, wherein execution of the instructions causes the device to perform operations further comprising:
identifying an object as a potential obstacle using one or more captures from the camera, wherein adjusting the first frame capture rate is further based on the identification of the object.

24. The non-transitory computer-readable storage medium of claim 18, wherein execution of the instructions further causes the device to perform operations including at least one from the group consisting of:
adjusting a frequency of processing information captured by the camera based on the magnitude of difference; and
adjusting a portion of the information captured by the camera to be processed by the device based on the magnitude of difference.

25. A device including a camera including a first direction of capture and a first frame capture rate, comprising:
means for determining a direction of travel of the device;
means for comparing the direction of travel to the first direction of capture to determine a magnitude of difference; and
means for adjusting the first frame capture rate of the camera to a second frame capture rate based on the magnitude of difference;
wherein the means for determining the direction of travel of the device further performs:
determining a trajectory of the device; and
predicting a future direction of travel for the device based on the trajectory of the device, wherein the future direction of travel is used as the direction of travel for comparing to the first direction of capture.

* * * * *